(12) United States Patent
Suzuki et al.

(10) Patent No.: US 11,343,426 B2
(45) Date of Patent: May 24, 2022

(54) NOTIFYING APPARATUS, IMAGE CAPTURING APPARATUS, NOTIFYING METHOD, AND STORAGE MEDIUM FOR MAKING A NOTIFICATION OF MOTION BLUR

(71) Applicant: CANON KABUSHIKI KAISHA, Tokyo (JP)

(72) Inventors: Hiroshi Suzuki, Kawasaki (JP); Shun Matsui, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/707,802

(22) Filed: Dec. 9, 2019

(65) Prior Publication Data

US 2020/0213511 A1 Jul. 2, 2020

(30) Foreign Application Priority Data

Dec. 28, 2018 (JP) .............................. JP2018-248374

(51) Int. Cl.
*H04N 5/232* (2006.01)

(52) U.S. Cl.
CPC ... *H04N 5/23222* (2013.01); *H04N 5/232941* (2018.08)

(58) Field of Classification Search
CPC ..................... H04N 5/23222; H04N 5/232941
See application file for complete search history.

(56) References Cited

U.S. PATENT DOCUMENTS

2007/0230931 A1* 10/2007 Nomura ............. H04N 5/23222
396/55
2020/0213528 A1* 7/2020 Yamaguchi ............... G06T 7/20

FOREIGN PATENT DOCUMENTS

| JP | 2008-015754 A | 1/2008 |
| JP | 2008-172667 A | 7/2008 |
| JP | 2016-092596 A | 5/2016 |

* cited by examiner

*Primary Examiner* — Christopher K Peterson
(74) *Attorney, Agent, or Firm* — Cowan, Liebowitz & Latman, P.C.

(57) ABSTRACT

There is provided a notifying apparatus. A detecting unit detects a motion amount of an object from an image obtained through first shooting, the first shooting being carried out repeatedly at predetermined intervals of time. A converting unit converts the motion amount into a motion blur amount that will arise in second shooting, on the basis of the predetermined intervals of time and an exposure time used in the second shooting. A determining unit determines whether or not to make a motion blur notification on the basis of a predetermined notification condition. A notifying unit makes a notification of motion blur on the basis of the motion blur amount when it has been determined that the motion blur notification is to be made.

30 Claims, 17 Drawing Sheets

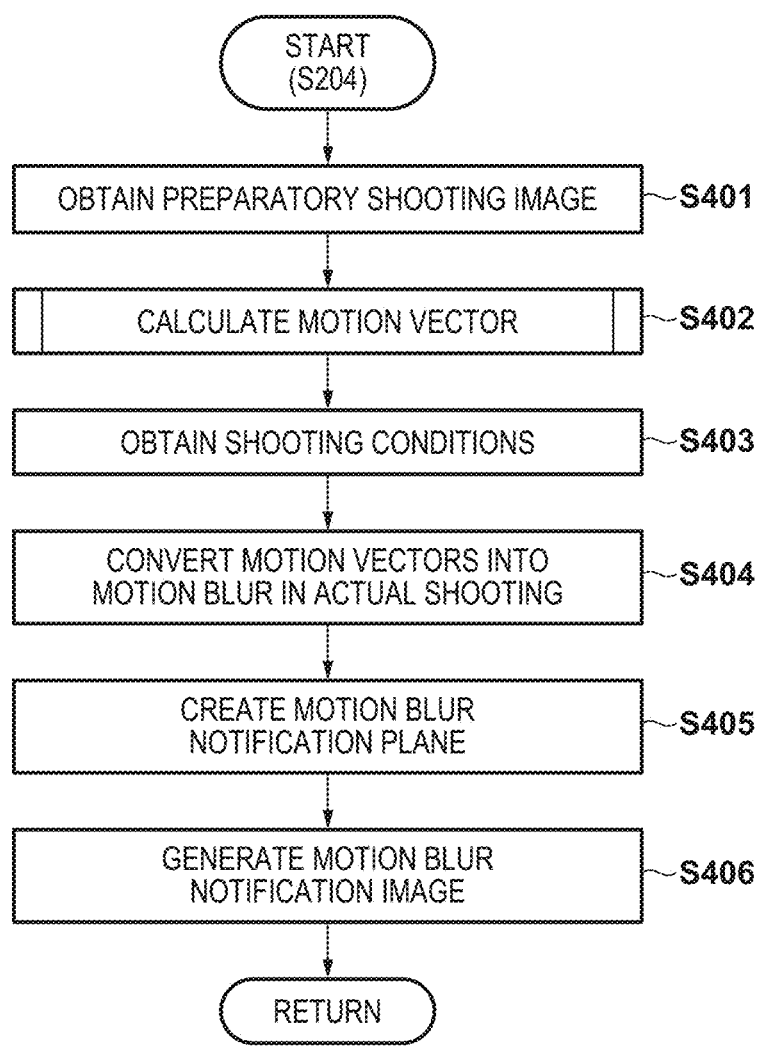

PREPARATORY SHOOTING IMAGE

MOTION VECTORS

MOTION BLUR NOTIFICATION ICON

MOTION BLUR NOTIFICATION FRAME

MOTION BLUR NOTIFICATION EDGE

BOKEH NOTIFICATION ICON

BOKEH NOTIFICATION FRAME

BOKEH NOTIFICATION EDGE

PUPIL DIVISION

CONFIGURATION OF PUPIL-DIVISION PIXELS

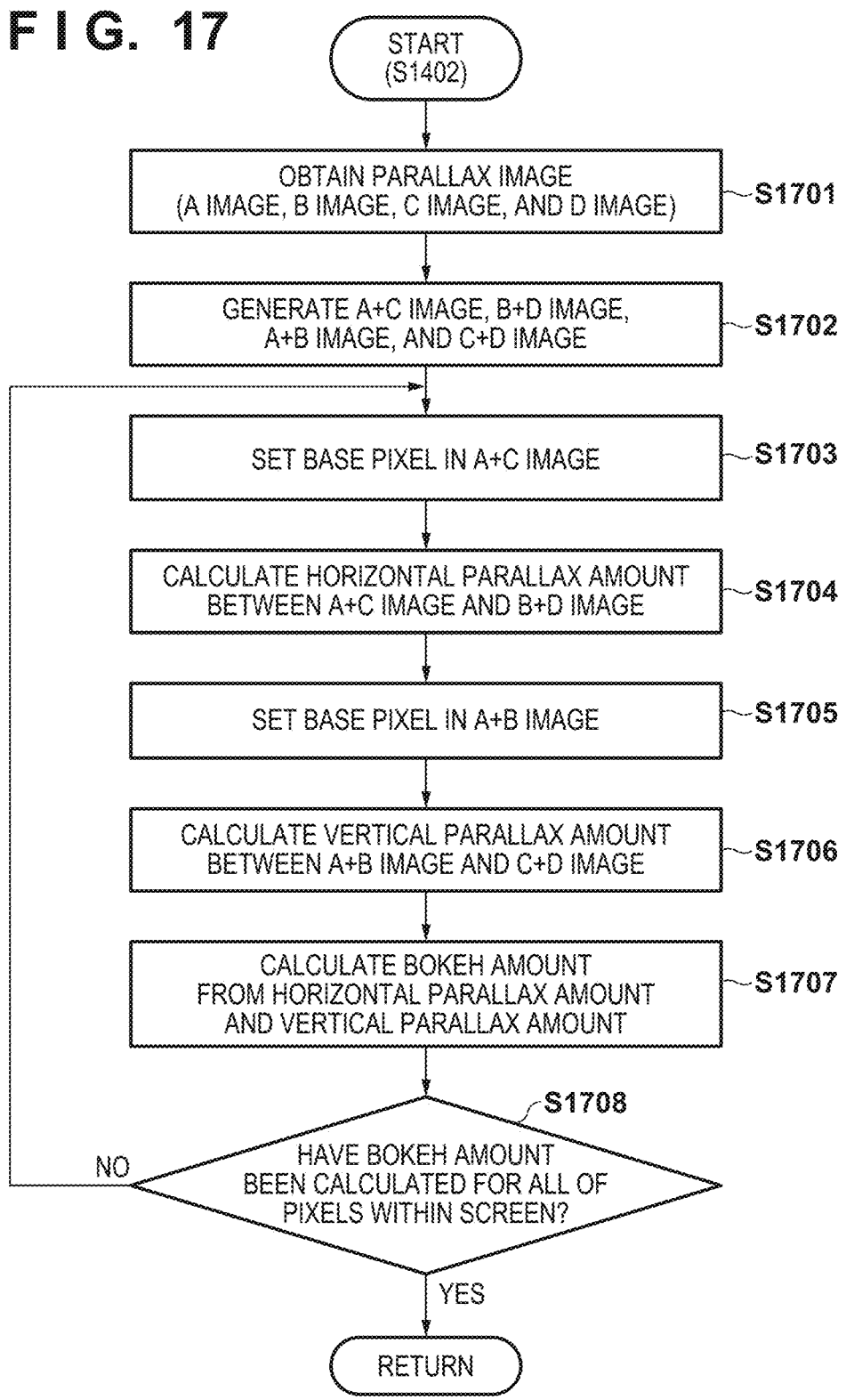

NOTIFYING APPARATUS, IMAGE CAPTURING APPARATUS, NOTIFYING METHOD, AND STORAGE MEDIUM FOR MAKING A NOTIFICATION OF MOTION BLUR

BACKGROUND OF THE INVENTION

Field of the Invention

The present invention relates to a notifying apparatus, an image capturing apparatus, a notifying method, and a storage medium.

Description of the Related Art

Recently, some commercial models of image capturing apparatuses such as digital still cameras are provided with a shooting mode called "shutter speed priority mode". The shutter speed priority mode is a shooting mode in which the photographer sets a desired shutter speed, and the image capturing apparatus then automatically sets exposure setting values aside from the shutter speed, such as the aperture value, ISO sensitivity, and so on. The photographer can shoot an image at his or her preferred shutter speed by using the shutter speed priority mode in this manner. For example, setting a fast shutter speed before shooting an image and then shooting the image in the shutter speed priority mode makes it possible to shoot an image having little motion blur.

Japanese Patent Laid-Open No. 2008-172667 discloses a technique that makes it possible for a photographer to visually confirm a motion region during preparatory shooting. "Preparatory shooting" refers to shooting carried out by the photographer to compose the shot, set the shooting conditions, and so on while looking at an electronic viewfinder or rear surface LCD of the image capturing apparatus. According to the technique disclosed in Japanese Patent Laid-Open No. 2008-172667, a motion region is detected between time-series images capturing during preparatory shooting, and that motion region is displayed in an emphasized manner.

According to the conventional technique described above, when the photographer sets the shooting conditions with primary concern for motion blur in the subject being shot, a display can be made which makes it easy to understand where the motion region is. However, always displaying the motion region in an enhanced manner is not necessarily desirable for the photographer. For example, when the photographer sets the shooting conditions with primary concern for focus adjustment, displaying the motion region in an enhanced manner may end up annoying the photographer.

SUMMARY OF THE INVENTION

Having been achieved in light of the aforementioned situation, the present invention provides a technique that makes it possible to provide a motion blur notification in accordance with the circumstances.

According to a first aspect of the present invention, there is provided a notifying apparatus comprising at least one processor and/or at least one circuit which functions as: a detecting unit configured to detect a motion amount of an object from an image obtained through first shooting, the first shooting being carried out repeatedly at predetermined intervals of time; a converting unit configured to convert the motion amount into a motion blur amount that will arise in second shooting, on the basis of the predetermined intervals of time and an exposure time used in the second shooting; a determining unit configured to determine whether or not to make a motion blur notification on the basis of a predetermined notification condition; and a notifying unit configured to make a notification of motion blur on the basis of the motion blur amount when it has been determined that the motion blur notification is to be made.

According to a second aspect of the present invention, there is provided a notifying apparatus comprising at least one processor and/or at least one circuit which functions as: a detecting unit configured to detect a motion amount of an object from an image obtained through first shooting, the first shooting being carried out repeatedly at predetermined intervals of time; a converting unit configured to convert the motion amount into a motion blur amount that will arise in second shooting, on the basis of the predetermined intervals of time and an exposure time used in the second shooting; a determining unit configured to determine whether to make a motion blur notification, or a second notification different from the motion blur notification, on the basis of a predetermined notification condition; and a notifying unit configured to make a notification of motion blur on the basis of the motion blur amount when it has been determined that the motion blur notification is to be made, and to make the second notification when it has been determined that the second notification is to be made.

According to a third aspect of the present invention, there is provided a notifying apparatus comprising at least one processor and/or at least one circuit which functions as: an obtaining unit configured to obtain a motion blur amount of an object and a bokeh amount produced by a shooting optical system, from an image obtained through first shooting, the first shooting being carried out repeatedly at predetermined intervals of time; a determining unit configured to determine a priority level for a motion blur notification based on the motion blur amount and for a bokeh notification based on the bokeh amount; and a notifying unit configured to make one or both of the motion blur notification and the bokeh notification in accordance with the priority level.

According to a fourth aspect of the present invention, there is provided a notifying apparatus comprising at least one processor and/or at least one circuit which functions as: an obtaining unit configured to obtain a first shot image obtained through first shooting under a first shooting condition, and motion information of an object in the first shot image; a setting unit configured to set a second shooting condition independently from the first shooting condition; an estimating unit configured to estimate a motion blur amount of the object in a second shot image obtained when carrying out second shooting under the second shooting condition, on the basis of the motion information and the second shooting condition; a determining unit configured to determine whether or not to make a motion blur notification on the basis of a predetermined notification condition; and a notifying unit configured to make a notification of motion blur on the basis of the motion blur amount when it has been determined that the motion blur notification is to be made.

According to a fifth aspect of the present invention, there is provided a notifying apparatus comprising at least one processor and/or at least one circuit which functions as: an obtaining unit configured to obtain a first shot image obtained through first shooting under a first shooting condition, and motion information of an object in the first shot image; a setting unit configured to set a second shooting condition independently from the first shooting condition; an estimating unit configured to estimate a motion blur amount of the object in a second shot image obtained when carrying out second shooting under the second shooting condition, on the basis of the motion information and the second shooting condition; a determining unit configured to determine whether to make a motion blur notification, or a second notification different from the motion blur notification, on the basis of a predetermined notification condition; and a notifying unit configured to make a notification of motion blur on the basis of the motion blur amount when it has been determined that the motion blur notification is to be made, and to make the second notification when it has been determined that the second notification is to be made.

According to a sixth aspect of the present invention, there is provided an image capturing apparatus comprising: the notifying apparatus according to the first aspect; and an image sensor.

According to a seventh aspect of the present invention, there is provided an image capturing apparatus comprising: the notifying apparatus according to the second aspect; and an image sensor.

According to an eighth aspect of the present invention, there is provided a notifying method executed by a notifying apparatus, comprising: detecting a motion amount of an object from an image obtained through first shooting, the first shooting being carried out repeatedly at predetermined intervals of time; converting the motion amount into a motion blur amount that will arise in second shooting, on the basis of the predetermined intervals of time and an exposure time used in the second shooting; determining whether or not to make a motion blur notification on the basis of a predetermined notification condition; and making a notification of motion blur on the basis of the motion blur amount when it has been determined that the motion blur notification is to be made.

According to a ninth aspect of the present invention, there is provided a notifying method executed by a notifying apparatus, comprising: detecting a motion amount of an object from an image obtained through first shooting, the first shooting being carried out repeatedly at predetermined intervals of time; converting the motion amount into a motion blur amount that will arise in second shooting, on the basis of the predetermined intervals of time and an exposure time used in the second shooting; determining whether to make a motion blur notification, or a second notification different from the motion blur notification, on the basis of a predetermined notification condition; and making a notification of motion blur on the basis of the motion blur amount when it has been determined that the motion blur notification is to be made, and making the second notification when it has been determined that the second notification is to be made.

According to a tenth aspect of the present invention, there is provided a non-transitory computer-readable storage medium which stores a program for causing a computer to execute a notifying method comprising: detecting a motion amount of an object from an image obtained through first shooting, the first shooting being carried out repeatedly at predetermined intervals of time; converting the motion amount into a motion blur amount that will arise in second shooting, on the basis of the predetermined intervals of time and an exposure time used in the second shooting; determining whether or not to make a motion blur notification on the basis of a predetermined notification condition; and making a notification of motion blur on the basis of the motion blur amount when it has been determined that the motion blur notification is to be made.

Further features of the present invention will become apparent from the following description of exemplary embodiments with reference to the attached drawings.

BRIEF DESCRIPTION OF THE DRAWINGS

FIG. 4 is a flowchart illustrating a process for generating a motion blur notification image (step S204 in FIG. 2).

FIG. 17 is a flowchart illustrating a bokeh amount calculation process (step S1402 in FIG. 14).

DESCRIPTION OF THE EMBODIMENTS

Figure 1:
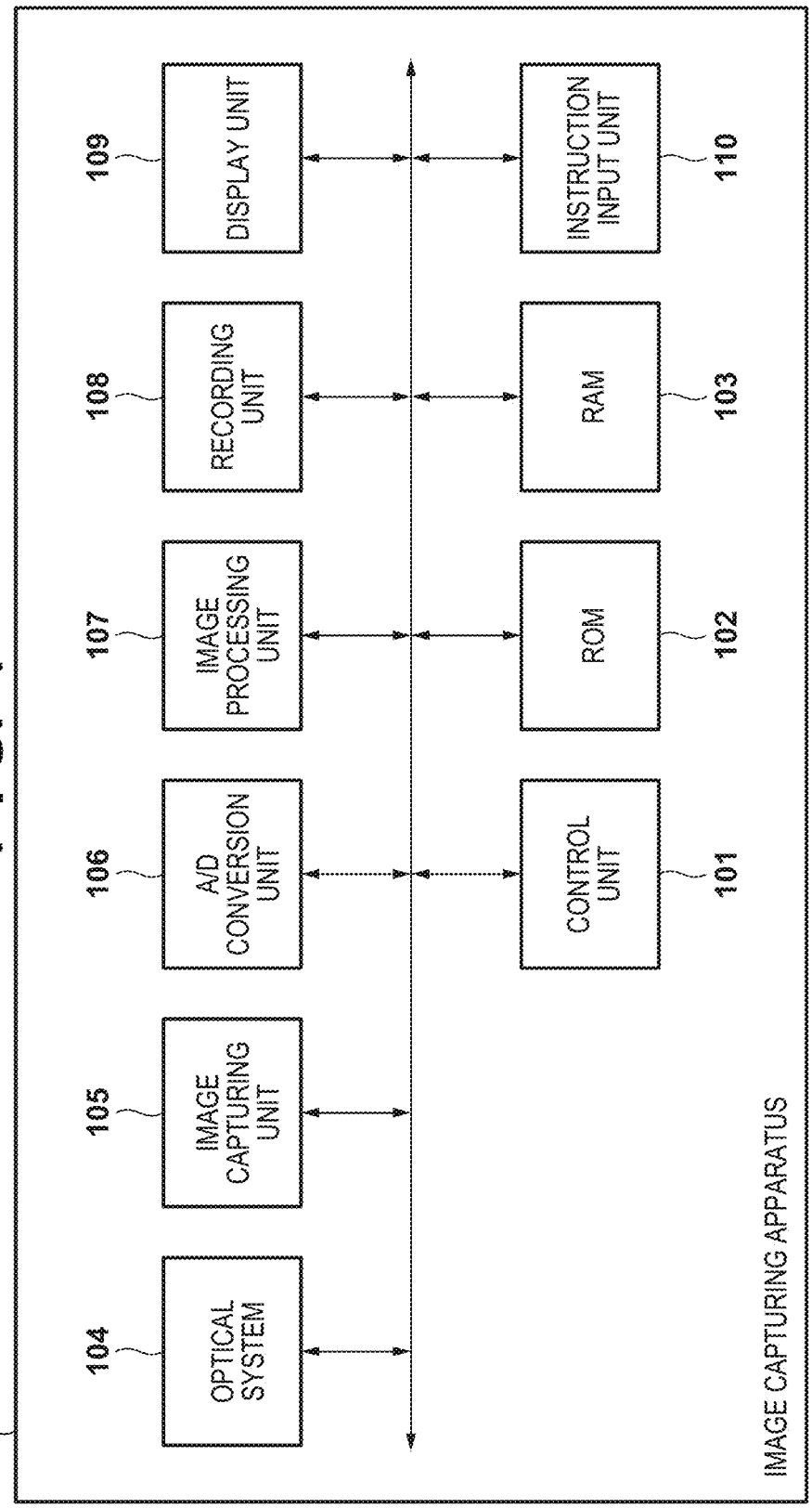
FIG. 1 is a block diagram illustrating the configuration of an image capturing apparatus 100 including a notifying apparatus.

Hereinafter, embodiments of the present invention will be described with reference to the attached drawings. Elements that are given the same reference numerals throughout all of the attached drawings represent the same or similar elements, unless otherwise specified. Note that the technical scope of the present invention is defined by the claims, and is not limited by the following respective embodiments. Also, not all of the combinations of the aspects that are described in the embodiments are necessarily essential to the present invention. Also, the aspects that are described in the individual embodiments can be combined as appropriate.

First Embodiment

FIG. 1 is a block diagram illustrating the configuration of an image capturing apparatus 100 including a notifying apparatus. The first embodiment will describe a configuration that switches a motion blur notification on and off.

A control unit 101 is a CPU, for example; the control unit 101 reads out control programs for controlling the various blocks of the image capturing apparatus 100 from ROM 102 (described later), loads the programs into RAM 103 (described later), and executes the programs. Through this, the control unit 101 can control the operations of the various blocks of the image capturing apparatus 100. The ROM 102 is electrically erasable/recordable non-volatile memory, and stores parameters and the like necessary for each of the blocks of the image capturing apparatus 100 to function, in addition to the control programs for controlling those blocks. The RAM 103 is rewritable volatile memory, and is used for loading the control programs executed by the control unit 101 and the like, temporarily storing data generated through the operations of the blocks of the image capturing apparatus 100, and the like.

An optical system 104 is constituted by a lens group including a zoom lens and a focus lens, and forms a subject image on an image capturing surface of an image capturing unit 105, which will be described later. The image capturing unit 105 is an image sensor such as a CCD or a CMOS sensor; the image capturing unit 105 photoelectrically converts an optical image formed on the image capturing surface of the image capturing unit 105 by the optical system 104 and outputs an analog image signal obtained as a result to an A/D conversion unit 106. The A/D conversion unit 106 converts the input analog image signal into digital image data. The digital image data output from the A/D conversion unit 106 is temporarily stored in the RAM 103.

An image processing unit 107 applies various types of image processing, such as white balance adjustment, color interpolation, and gamma processing, to the image data stored in the RAM 103. The image processing unit 107 also includes a notification image generating unit 300 (described later), which generates a motion blur notification image by superimposing an image plane enabling motion blur to be easily confirmed over an image stored in the RAM 103.

A recording unit 108 is a removable memory card or the like. The recording unit 108 records the image data processed by the image processing unit 107 as a recorded image, via the RAM 103. A display unit 109 is a display device such as an LCD; the display unit 109 displays images stored in the RAM 103, images recorded into the recording unit 108, a user interface for operations for accepting instructions from the user, and so on. The display unit 109 also displays images captured by the image capturing unit 105, for composing the shot and the like during preparatory shooting. An instruction input unit 110 is a touch panel, a mouse, or the like. The user inputs instructions to the image capturing apparatus 100 using the instruction input unit 110.

A shooting process executed by the image capturing apparatus 100 will be described next with reference to FIG. 2. Unless otherwise specified, the processes in the respective steps of this flowchart are realized by the control unit 101 executing the aforementioned control programs. The processing illustrated in this flowchart starts when the user turns the image capturing apparatus 100 on and an operating mode of the image capturing apparatus 100 enters a shooting mode.

In step S201, the control unit 101 starts preparatory shooting (first shooting). During the period of the preparatory shooting, the image capturing apparatus 100 captures images in sequence, in the same manner as a moving image (a preparatory shooting image), and displays that image in the display unit 109. In other words, during the period of the preparatory shooting, the preparatory shooting is carried out repeatedly at predetermined intervals of time. The user composes the shot and so on while viewing the display preparatory shooting image. Note that the processes of steps S202 to S206 (described hereinafter) are carried out during the period of preparatory shooting.

In step S202, the control unit 101 sets shooting conditions for actual shooting (second shooting) in response to user instructions (user operations) made using the instruction input unit 110. The shooting conditions include exposure conditions, and the exposure conditions include the shutter speed, ISO sensitivity, F-stop value, and so on.

In step S203, the control unit 101 determines whether to turn the motion blur notification on or off. The determination as to whether to turn the motion blur notification on or off is assumed to be carried out in accordance with the details of the user operations made in step S202. The determination made here will be described in detail later. If it has been determined that the motion blur notification is to be turned on, the process moves to step S204, and if not, the process moves to step S205.

In step S204, under the control of the control unit 101, the notification image generating unit 300 generates the motion blur notification image by superimposing a motion blur notification plane onto the preparatory shooting image. In other words, the motion blur notification image is a preparatory shooting image with the motion blur notification plane superimposed thereon. The process of step S204 will be described in detail later with reference to FIG. 4.

In step S205, the control unit 101 displays an image in the display unit 109. Specifically, when the motion blur notification image has been generated in step S204 (when it has been determined in step S203 that the motion blur notification is to be turned on), the control unit 101 displays the motion blur notification image (the preparatory shooting image onto which the motion blur notification plane has been superimposed) in the display unit 109. When the motion blur notification image has not been generated (when it has been determined in step S203 that the motion blur notification is to be turned off), the control unit 101 displays the preparatory shooting image (the preparatory shooting image onto which the motion blur notification plane has not been superimposed) in the display unit 109.

In step S206, the control unit 101 determines whether or not the user has pressed a shutter button. The shutter button is included in the instruction input unit 110, for example. If the shutter button has been pressed, the process moves to step S207, and if not, the process returns to step S202.

While viewing the preparatory shooting image or the motion blur notification image displayed in the display unit 109, the user can press the shutter button when he or she has the chance to take a shot. The user can easily confirm motion blur during the preparatory shooting when the motion blur notification image is being displayed in the display unit 109. If the motion blur the user has confirmed is not motion blur that meets his or her preferences, the user can avoid pressing the shutter button, which returns the process to step S202 and makes it possible to change (reset) the shutter speed (exposure time) for the actual shooting. In this manner, during the preparatory shooting, the user can repeatedly change the shutter speed (exposure time) for the actual shooting while confirming the motion blur notification image displayed in the display unit 109 until the motion blur that meets his or her preferences is achieved, and can then press the shutter button when there is a chance to take a shot.

When the shutter button is pressed in step S206, the control unit 101 carries out actual shooting, and records the image from the actual shooting in the recording unit 108, in step S207.

The determination as to whether to turn the motion blur notification on or off, carried out in step S203, will be described in detail here. As described earlier, the control unit 101 determines whether to turn the motion blur notification on or off in accordance with the details of the user operations made in step S202. If the degree of motion blur has been changed by user operations, the control unit 101 determines that the user wishes to confirm the motion blur, and turns the motion blur notification on. For example, if the user is manipulating a Tv dial included in the instruction input unit 110, the degree of motion blur will change in response to changes in the shutter speed. As such, the control unit 101 determines that the user wishes to confirm the motion blur, and turns the motion blur notification on. Conversely, if the degree of motion blur will not change in response to user operations, the control unit 101 determines that the motion blur need not be confirmed, and turns the motion blur notification off. For example, if the user is manipulating an Av dial included in the instruction input unit 110, the degree of motion blur will not change. As such, the control unit 101 determines that the motion blur need not be confirmed, and turns the motion blur notification off. Thus switching the motion blur notification on and off dynamically in accordance with the details of the user operations makes it possible to provide shooting assistance at an appropriate timing.

Figure 3:
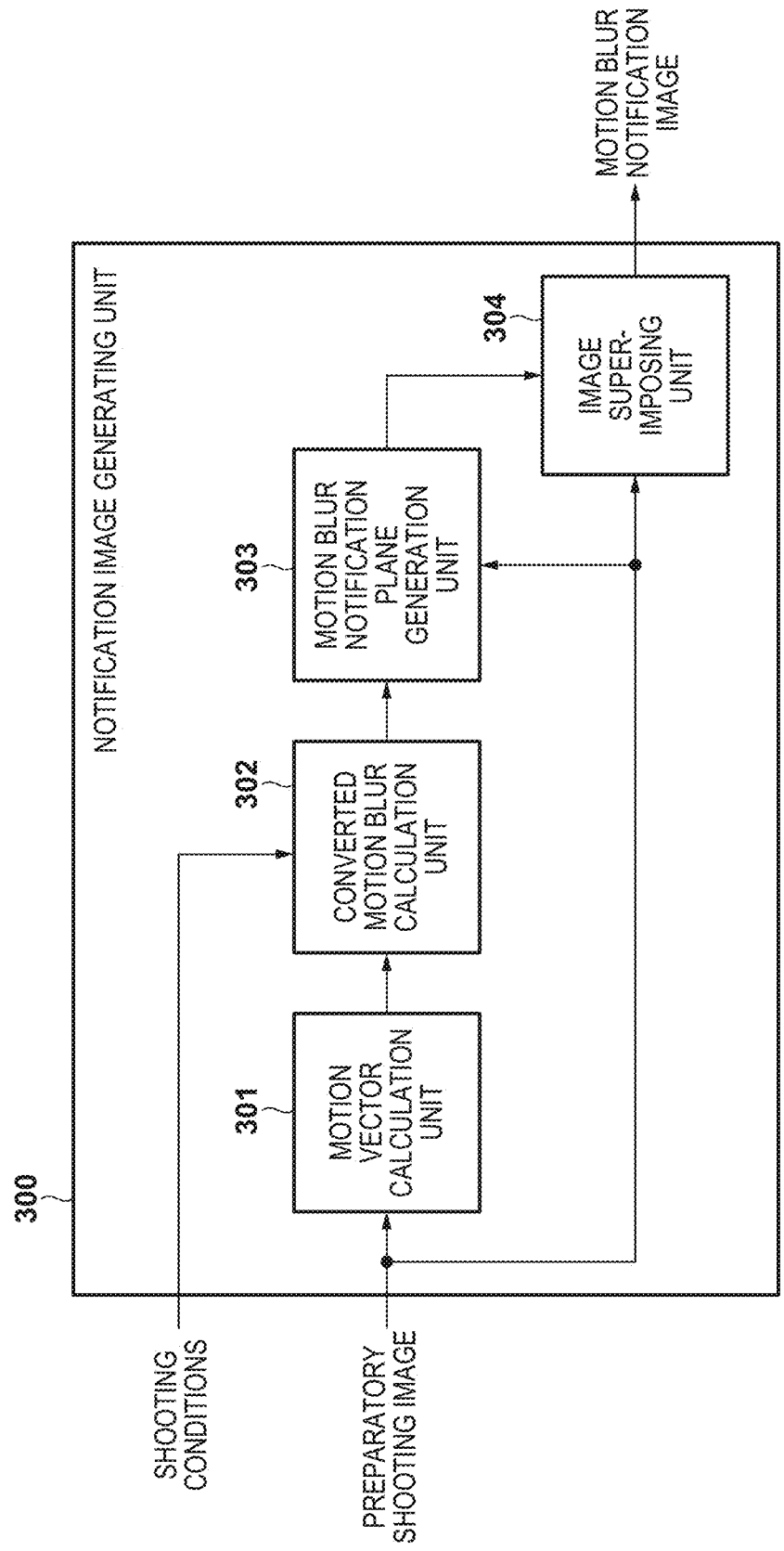
FIG. 3 is a diagram illustrating an example of the configuration of a notification image generating unit 300 included in an image processing unit 107 according to the first embodiment.

An example of the configuration of the notification image generating unit 300 included in the image processing unit 107 will be described next with reference to FIG. 3. The notification image generating unit 300 includes a motion vector calculation unit 301, a converted motion blur calculation unit 302, a motion blur notification plane generation unit 303, and an image superimposing unit 304. The operations of the notification image generating unit 300 will be described in detail later with reference to FIG. 4.

Next, the process by which the notification image generating unit 300 generates the motion blur notification image (step S204 in FIG. 2) will be described in detail with reference to FIG. 4.

In step S401, the notification image generating unit 300 obtains the preparatory shooting image captured during the preparatory shooting by the image capturing apparatus 100. The obtained preparatory shooting image is input to the motion vector calculation unit 301 and the image superimposing unit 304.

Figure 5A:
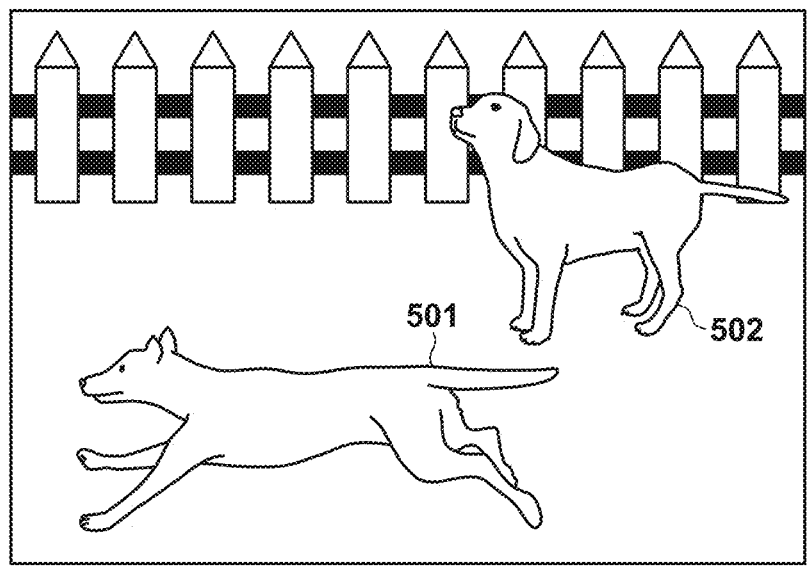
FIG. 5A is a diagram illustrating an example of a preparatory shooting image.

FIG. 5A is a diagram illustrating an example of the preparatory shooting image. The present embodiment will describe an example in which, as illustrated in FIG. 5A, a scene is shot in which a dog 501 is running to the left and a dog 502 is standing still.

In step S402, the motion vector calculation unit 301 calculates a motion vector between the preparatory shooting images as motion information. A "motion vector" expresses horizontal and vertical direction movement amounts of an object between preparatory shooting images as a vector. The method for calculating the motion vector will be described in detail later with reference to FIGS. 6 and 7.

Figure 6:
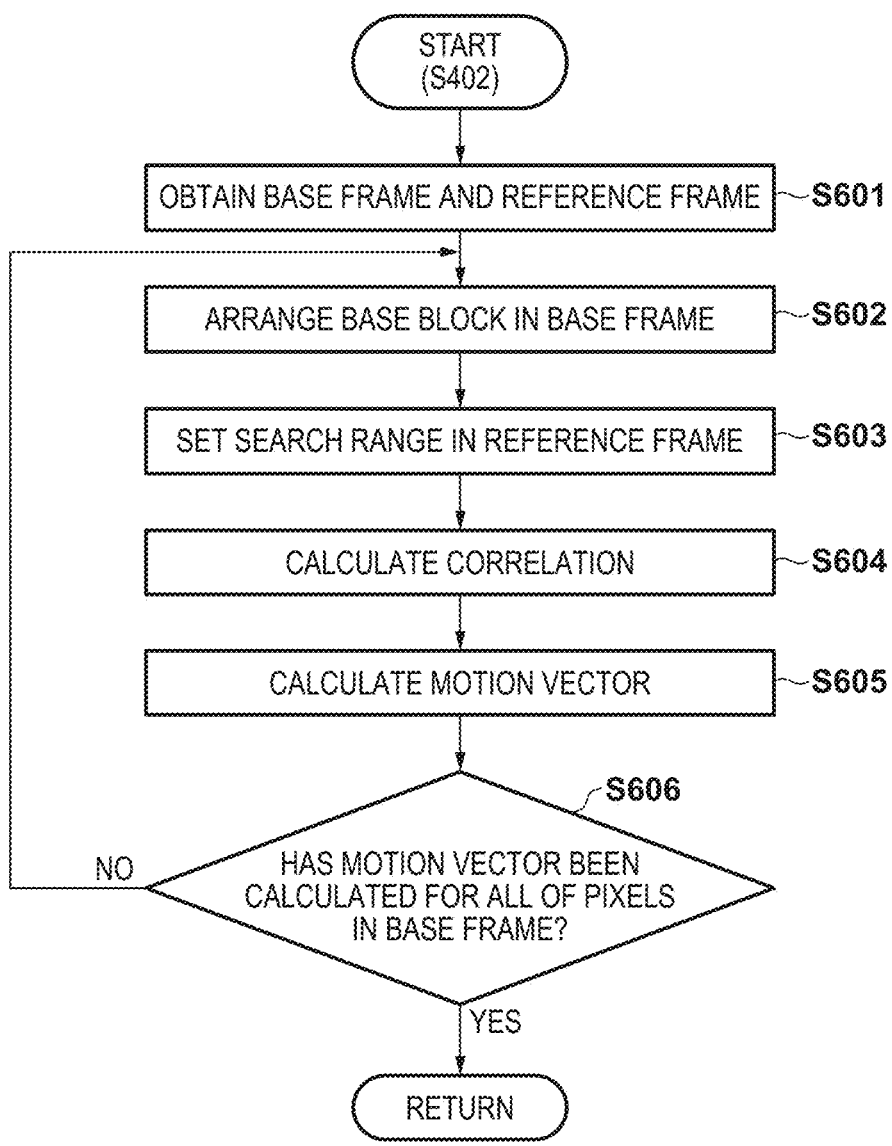
FIG. 6 is a flowchart illustrating a motion vector calculation process (step S402 in FIG. 4).

FIG. 6 is a flowchart illustrating the motion vector calculation process carried out by the motion vector calculation unit 301 (step S402 in FIG. 4). Although the present embodiment will describe a block matching method as an example of the method for calculating the motion vector, the method for calculating the motion vector is not limited to this example, and may be gradient method instead, for example.

In step S601, the motion vector calculation unit 301 obtains two preparatory shooting images adjacent with respect to time. The motion vector calculation unit 301 then sets the preparatory shooting image from an Mth frame as a base frame, and sets the preparatory shooting image from an M+1th frame as a reference frame.

Figure 7:
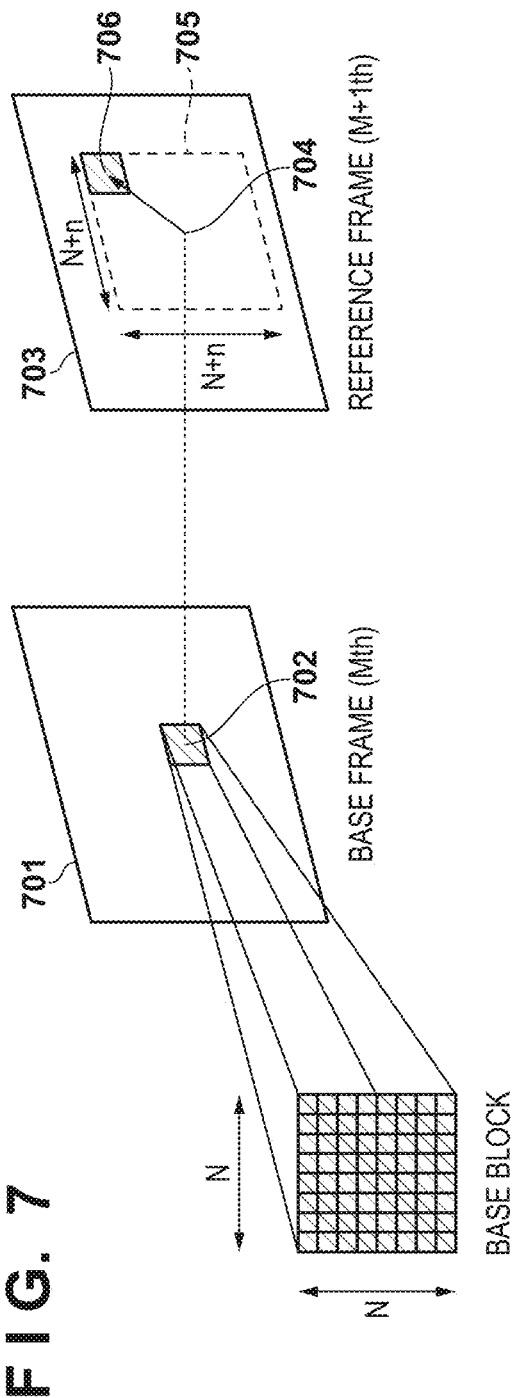
FIG. 7 is a diagram illustrating the motion vector calculation process (step S402 in FIG. 4).

As illustrated in FIG. 7, in step S602, the motion vector calculation unit 301 arranges a base block 702, made up of N×N pixels, in a base frame 701.

Also as illustrated in FIG. 7, in step S603, the motion vector calculation unit 301 sets pixels (N+n)×(N+n), which surround coordinates 704 that match the center coordinates of the base block 702 in the base frame 701, in a reference frame 703 as a search range 705.

In step S604, the motion vector calculation unit 301 calculates the correlation between the base block 702 in the base frame 701, and an N×N-pixel reference block 706 at coordinates present within the search range 705 in the reference frame 703, to calculate a correlation value. The correlation value is calculated on the basis of an inter-frame difference absolute value sum for the pixels in the base block 702 and the reference blocks 706. In other words, the coordinates where the value of the inter-frame difference absolute value sum is lowest are the coordinates where the correlation value is the highest. Note that the method for calculating the correlation value is not limited to a method that finds the inter-frame difference absolute value sum, and may instead be a method for calculating the correlation value on the basis of an inter-frame difference sum of squares, a normal cross-correlation value, or the like, for example. The example in FIG. 7 indicates that the reference blocks 706 has the highest correlation.

In step S605, the motion vector calculation unit 301 calculates the motion vector on the basis of the reference block coordinates indicating the highest correlation value found in step S604. In the example in FIG. 7, the motion vector is found on the basis of the coordinates 704 corresponding to the center coordinates of the base block 702 in the base frame 701, and the center coordinates of the reference block 706, in the search range 705 of the reference frame 703. In other words, the inter-coordinate distance and direction, from the coordinates 704 to the center coordinates of the reference block 706, are found as the motion vector.

In step S606, the motion vector calculation unit 301 determines whether or not a motion vector has been calculated for all of the pixels in the base frame 701. If the motion vector calculation unit 301 has determined in step S606 that a motion vector has not been calculated for all of the pixels, the process returns to step S602, whereas if the motion vector calculation unit 301 has determined that a motion vector has been calculated for all of the pixels, the process returns to the flowchart of FIG. 4.

When the process returns to step S602, the motion vector calculation unit 301 arranges an N×N-pixel base block 702 in the aforementioned base frame 701, central to a pixel for which a motion vector has not yet been calculated. The processing from steps S603 to S605 is then carried out in the same manner as described earlier. In other words, the motion vector calculation unit 301 calculates motion vectors for all of the pixels in the base frame 701 by repeating the processing from steps S602 to S605 while moving the base block 702 in FIG. 7.

Figure 5B:
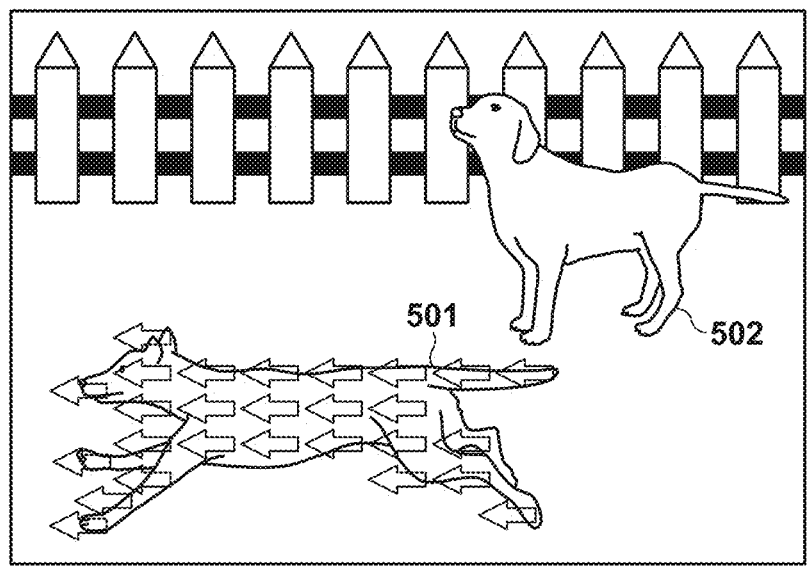
FIG. 5B is a diagram illustrating an example of motion vectors in a preparatory shooting image.

FIG. 5B illustrates an example of the motion vectors calculated in this manner. FIG. 5B is a diagram illustrating an example of motion vectors in the preparatory shooting image indicated in FIG. 5A. The preparatory shooting image in FIG. 5A is an example in which the dog 501 is running to the left. FIG. 5B illustrates an example of the motion vectors in the case where an object is moving in this manner. In the example illustrated in FIG. 5B, leftward motion vectors are detected in the region corresponding to the running dog 501, whereas "0" is detected as the motion vectors in other regions, such as the dog 502 that is standing still, the fence in the background, and so on. The motion vectors of "0" are not illustrated.

Note that the motion vector calculation unit 301 may calculate a motion vector every predetermined number of pixels instead of calculating motion vectors for all of the pixels.

The motion vector calculation unit 301 calculates the motion vectors between preparatory shooting images adjacent with respect to time through the foregoing processing.

Figure 2:
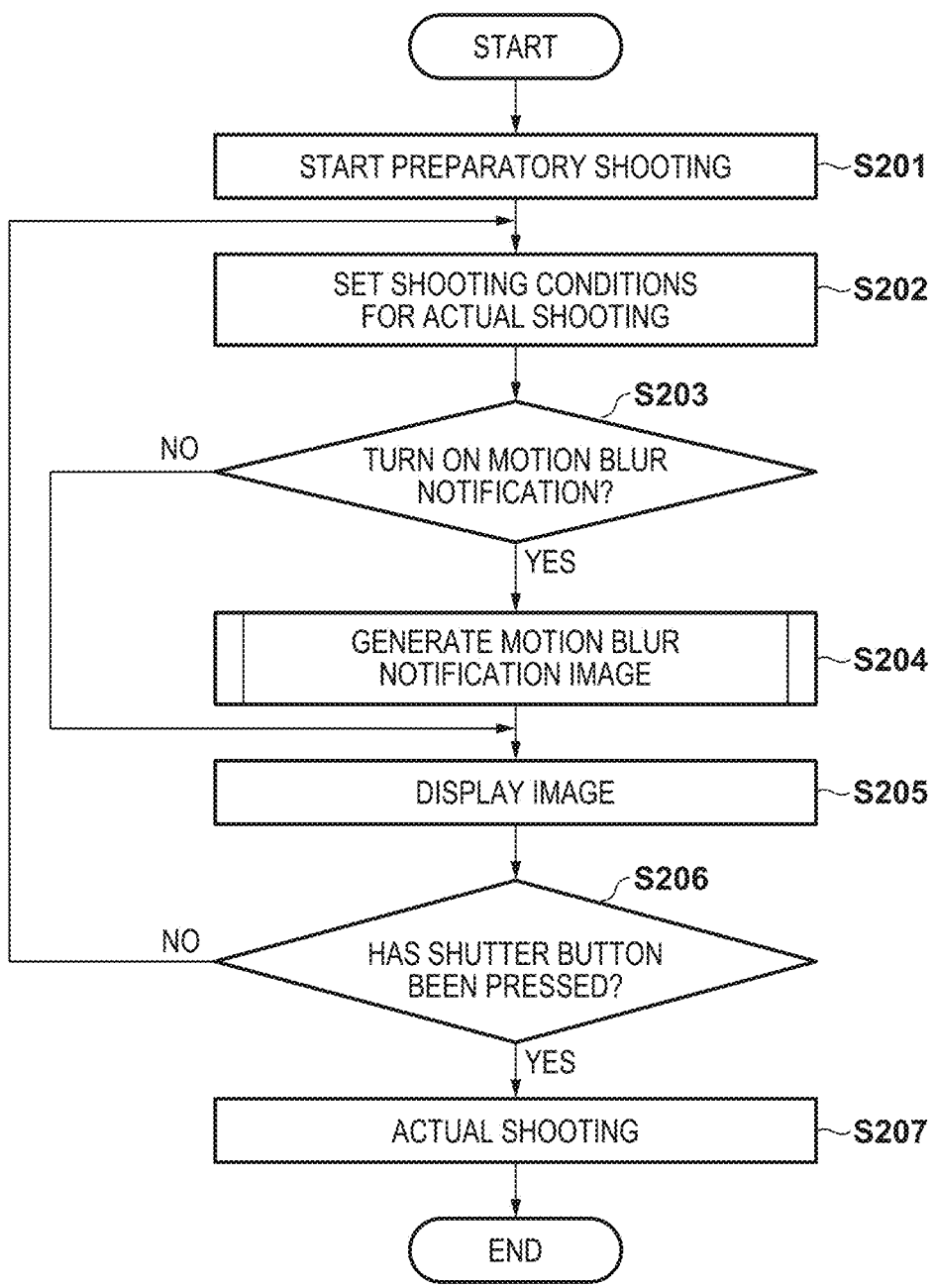
FIG. 2 is a flowchart illustrating a shooting process according to a first embodiment.

Returning to FIG. 4, in step S403, the converted motion blur calculation unit 302 obtains the shutter speed (exposure time) for the actual shooting set in step S202 of FIG. 2, and the time interval between the images in the preparatory shooting, as the shooting conditions.

In step S404, the converted motion blur calculation unit 302 converts the motion vectors for each pixel, calculated in step S402, into motion blur in the actual shooting, on the basis of the exposure time for the actual shooting and the time interval between the images in the preparatory shooting, which were obtained in step S403. The method for converting the motion vectors from the preparatory shooting into the motion blur in the actual shooting will be described in detail with reference to FIG. 8.

Figure 8:
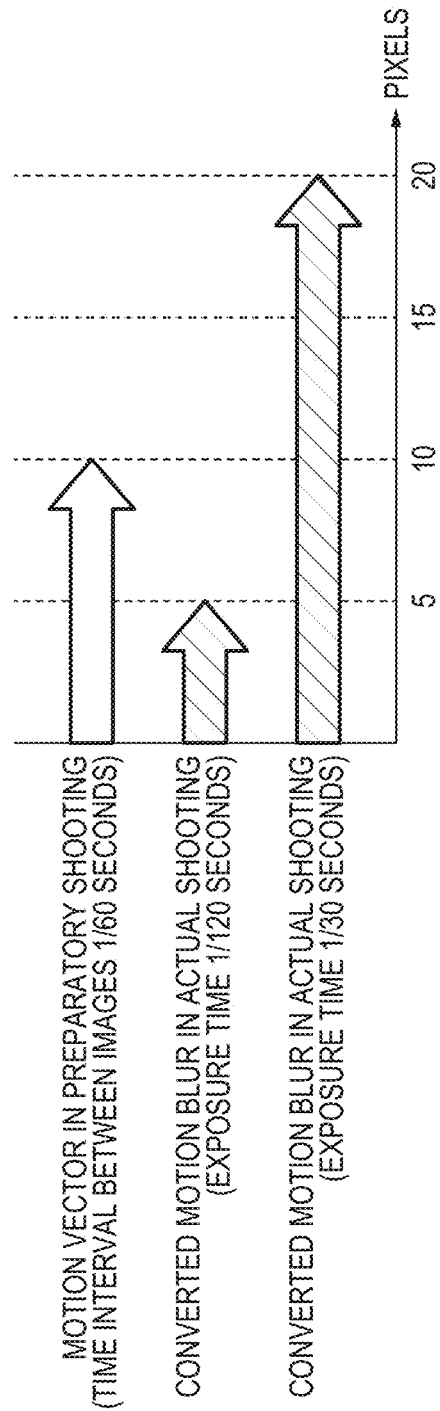
FIG. 8 is a diagram illustrating a motion vector in preparatory shooting, and motion blur, in actual shooting, converted from the motion vector in the preparatory shooting (converted motion blur).

FIG. 8 is a diagram illustrating a motion vector in preparatory shooting, and motion blur, in actual shooting, converted from the motion vector in the preparatory shooting (converted motion blur). FIG. 8 illustrates an example in which the time interval between the images in the preparatory shooting is 1/60 seconds, and the exposure time in the actual shooting is 1/120 seconds or 1/30 seconds.

The converted motion blur calculation unit 302 converts the motion vector for each pixel into motion blur in the actual shooting on the basis of the following conversion equations (1) and (2).

$$\text{CONV\_GAIN} = \text{EXP\_TIME} / \text{INT\_TIME} \quad (1)$$

$$\text{CONV\_BLUR} = \text{VEC\_LEN} \times \text{CONV\_GAIN} \quad (2)$$

Here, in Equation (1), CONV_GAIN represents a conversion gain for converting the motion vector in the preparatory shooting into a motion vector in the actual shooting, EXP_TIME represents the exposure time in the actual shooting, and INT_TIME represents the time interval between images in the preparatory shooting. In Equation (2), CONV_BLUR represents the converted motion blur in the actual shooting, and VEC_LEN indicates the length of the motion vector in the preparatory shooting.

In Equation (1), the conversion gain CONV_GAIN is calculated by dividing the exposure time EXP_TIME in the actual shooting by the time interval INT_TIME between images in the preparatory shooting. In Equation (2), the converted motion blur CONV_BLUR in the actual shooting is calculated by multiplying the length VEC_LEN of the motion vector by the conversion gain CONV_GAIN.

Specifically, as illustrated in FIG. 8, when the length VEC_LEN of the motion vector in the preparatory shooting is 10 pixels and the exposure time EXP_TIME in the actual shooting is 1/120 seconds, the conversion gain CONV_GAIN is 1/2×, and thus the converted motion blur is 5 pixels. Likewise, when the exposure time EXP_TIME in the actual shooting is 1/30 seconds, the conversion gain CONV_GAIN is 2×, and thus the converted motion blur is 20 pixels.

Returning to FIG. 4, in step S405, the motion blur notification plane generation unit 303 creates an image plane for notifying the user of the motion blur (a motion blur notification plane) on the basis of the converted motion blur for each pixel, calculated in step S404.

In step S406, the image superimposing unit 304 generates the motion blur notification image by superimposing the motion blur notification plane created in step S405 onto the preparatory shooting image.

Three examples of the motion blur notification image will be described here with reference to FIG. 9A to 9C. Displaying the motion blur notification image in the display unit 109 during the preparatory shooting makes it possible for the user to easily confirm the motion blur.

Figure 9A:
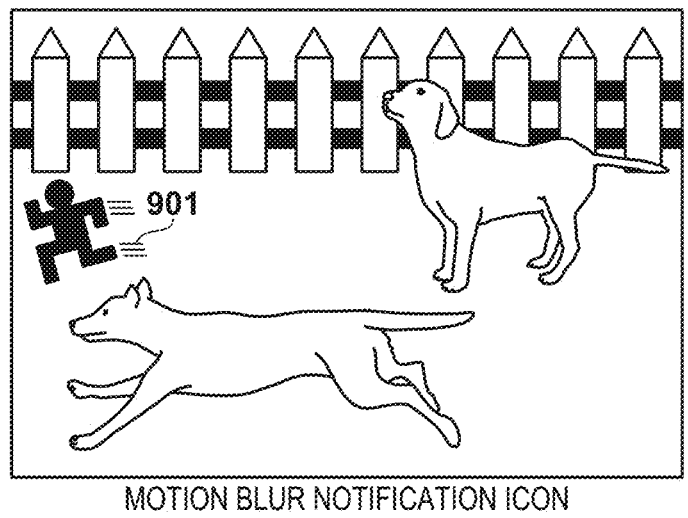
FIGS. 9A to 9C are diagrams illustrating three examples of a motion blur notification image.

FIG. 9A illustrates an example of notifying the user of the motion blur by displaying an icon. A method for generating the motion blur notification image by displaying an icon will be described here. In step S405, of the converted motion blur for each pixel, the motion blur notification plane generation unit 303 calculates the percentage of the number of pixels having a converted motion blur of a predetermined value or higher, with respect to the entire screen. If the percentage is greater than or equal to a predetermined percentage, the motion blur notification plane generation unit 303 creates a motion blur notification icon 901, such as that indicated in FIG. 9A, as the motion blur notification plane. In step S406, the image superimposing unit 304 generates a motion blur notification image such as that illustrated in FIG. 9A by superimposing the motion blur notification plane, including the motion blur notification icon 901, onto the preparatory shooting image.

Figure 9B:
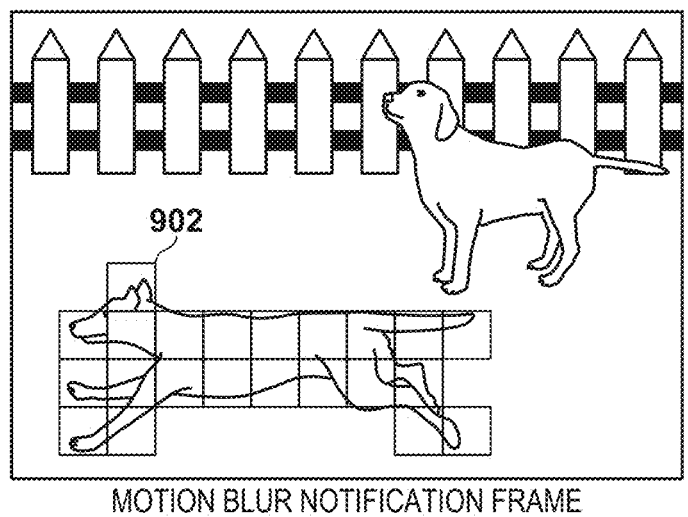

FIG. 9B illustrates an example of notifying the user of the motion blur by displaying frames. A method for generating the motion blur notification image by displaying frames will be described here. In step S405, of the pixels within divided regions of the shooting screen, the motion blur notification plane generation unit 303 calculates the percentage of the number of pixels having a converted motion blur of a predetermined value or higher, with respect to the overall divided regions. For divided regions in which that percentage is greater than or equal to a predetermined percentage, the motion blur notification plane generation unit 303 creates motion blur notification frames 902, as illustrated in FIG. 9B, as the motion blur notification plane. In step S406, the image superimposing unit 304 generates a motion blur notification image such as that illustrated in FIG. 9B by superimposing the motion blur notification plane, including the motion blur notification frames 902, onto the preparatory shooting image.

Figure 9C:
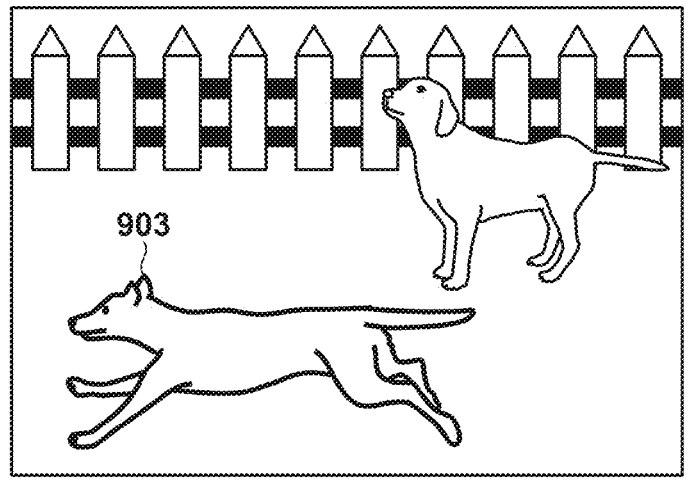

FIG. 9C illustrates an example of notifying the user of the motion blur by displaying edges in which motion blur has arisen in an enhanced manner. A method for generating the motion blur notification image by displaying the edges in which motion blur has arisen in an enhanced manner will be described here. In step S405, the motion blur notification plane generation unit 303 detects the edge strength of the preparatory shooting image. It is assumed that the edge strength is calculated using a known technique such as a Sobel filter, so this will not be described here. The motion blur notification plane generation unit 303 then extracts pixels for which the edge strength is greater than or equal to a predetermined value and for which the converted motion blur is greater than or equal to a predetermined value. The motion blur notification plane generation unit 303 then creates a motion blur notification plane, in which the edges where motion blur has arisen are displayed in an enhanced manner for the extracted pixels, as indicated by a motion blur notification edge 903 in FIG. 9C. In step S406, the image superimposing unit 304 generates a motion blur notification image such as that illustrated in FIG. 9C by superimposing the motion blur notification plane, including the motion blur notification edge 903, onto the preparatory shooting image. FIG. 9C illustrates an example in which the motion blur notification edge 903 is displayed at a bolder weight than the other edges. An enhanced display in which pixels having an edge strength greater than or equal to a predetermined value and having a converted motion blur greater than or equal to a predetermined value are extracted, and the extracted pixels are colored red, can be given as another example of the enhanced display method.

According to the first embodiment as described thus far, the image capturing apparatus 100 detects the motion amount of an object from an image obtained through preparatory shooting, and converts the motion amount to a motion blur amount arising during actual shooting. The image capturing apparatus 100 also determines whether or not to make a motion blur notification on the basis of predetermined notification condition(s), and notifies the user of the motion blur on the basis of the motion blur amount as indicated in FIGS. 9A to 9C, for example, upon determining that a motion blur notification is to be made. The "predetermined notification condition(s)" for determining whether or not to make the motion blur notification are the details of the user operations for changing the shooting condition(s) for the actual shooting, for example. In the example described above, the image capturing apparatus 100 determines that the motion blur notification is to be made if the user had made an operation for changing the exposure time in the actual shooting (e.g., manipulating the Tv dial included in the instruction input unit 110). This makes it possible to make a motion blur notification based on the situation.

Although the present embodiment describes a configuration in which whether to turn the motion blur notification on or off is determined in accordance with the details of user operations, the basis for determining whether to turn the motion blur notification on or off (the predetermined notification conditions) is not limited thereto. For example, a configuration may be employed in which when the object being shot is moving at a speed greater than or equal to a threshold, it is determined that the user wishes to confirm the motion blur, and the motion blur notification is turned on. The magnitude of the above-described motion vectors can be used as the speed of the object, for example. In this case, the control unit 101 turns the motion blur notification on when the magnitude of the motion vector is greater than or equal to a threshold. Note that when the magnitude of the motion vector is used as the speed of the object, the order of the processes in FIG. 2 is changed so that the process of calculating the motion vector is carried out before the process of step S203 in FIG. 2.

The present embodiment describes, with reference to FIG. 9A to 9C, an example in which the user is notified of the motion blur when the converted motion blur is greater than or equal to a predetermined value. However, a configuration in which the user is notified of the motion blur even when the converted motion blur is less than the predetermined value may be employed. This makes it easy for the user to confirm whether the motion blur is insufficient during the preparatory shooting period, such as in long-exposure shooting, where the user wishes to use motion blur to express a sense of motion.

Although the present embodiment describes the motion blur notification icon 901, the motion blur notification frames 902, and the motion blur notification edge 903 as three examples of the motion blur notification plane, the types of the motion blur notification planes are not limited thereto. For example, a configuration may be employed in which all regions where motion blur is arising, including both the edge region and a flat region, are displayed in an enhanced manner. Specifically, the motion blur notification plane generation unit 303 carries out an enhanced display in which the pixels where the per-pixel converted motion blur is greater than or equal to a predetermined value are colored red. Carrying out the enhanced display for both the edge region and regions aside from the edge region in this manner ensure the entire object is displayed in an enhanced manner, which makes it easier to confirm motion blur.

Additionally, although the present embodiment describes a configuration in which the motion blur notification image is displayed in the display unit 109 as the method for notifying the user of motion blur, the method for notifying the user of motion blur is not limited thereto. For example, a configuration in which the user is notified of motion blur by sound may be employed. In this case, for example, the control unit 101 may output a motion blur notification sound from a speaker (not shown) when, of the converted motion blur for each pixel, the percentage of the number of pixels having a converted motion blur of a predetermined value or higher, with respect to the entire screen, is greater than or equal to a predetermined percentage.

The present embodiment describes a configuration in which the motion amount of an object is detected from an image obtained through preparatory shooting, and by converting that motion amount to a motion blur amount that will arise in the actual shooting, the motion blur amount that will arise in the actual shooting is estimated. However, the method for estimating the motion blur amount that will arise in the actual shooting is not limited thereto. Additionally, the two instances of shooting, i.e., the preparatory shooting and the actual shooting, may be any two types of shooting (first shooting and second shooting). For example, the image capturing apparatus 100 may obtain a first shot image obtained through the first shooting under first shooting condition(s), and motion information of an object in the first shot image. The motion information obtained here is the speed of the object in the first shot image (e.g., a movement amount in a unit of time, expressed as a number of pixels). Then, on the basis of the motion information and second shooting condition(s), the image capturing apparatus 100 may estimate the motion blur amount of the object in a second shot image obtained when the second shooting is carried out under the second shooting condition(s). The second shooting condition(s) are set independent from the first shooting condition(s). This point also applies to the second embodiment and the third embodiment, which will be described hereinafter.

Second Embodiment

The first embodiment describes a configuration that switches the motion blur notification on and off. The second embodiment will describe a configuration that switches between a motion blur notification and a focus degree notification. In the second embodiment, the basic configuration of the image capturing apparatus 100 is the same as in the first embodiment (see FIG. 1). The following will primarily describe areas that are different from the first embodiment.

Figure 10:
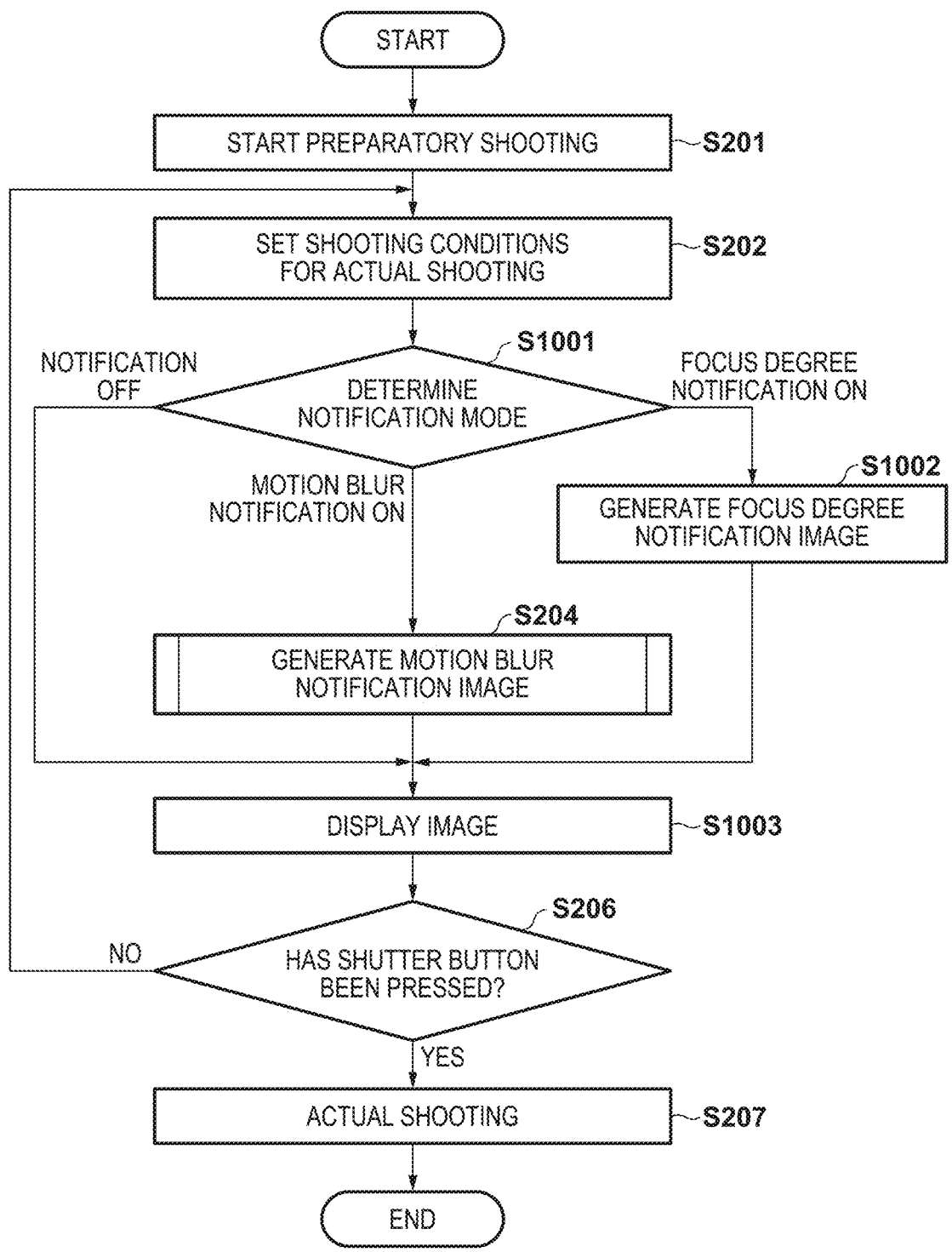
FIG. 10 is a flowchart illustrating a shooting process according to a second embodiment.

FIG. 10 is a flowchart illustrating a shooting process executed by the image capturing apparatus 100 according to the second embodiment. Unless otherwise specified, the processes in the respective steps of this flowchart are realized by the control unit 101 executing the aforementioned control programs. The processing illustrated in this flowchart starts when the user turns the image capturing apparatus 100 on and an operating mode of the image capturing apparatus 100 enters a shooting mode.

In step S1001, the control unit 101 determines which of notification modes, namely "motion blur notification on", "focus degree notification on", and "notifications off", to operate in, on the basis of the details of the user operation made in step S202. The process moves to step S204 when the mode is "motion blur notification on"; to step S1002, when the mode is "focus degree notification on"; and to step S1003, when the mode is "notifications off".

In step S1002, under the control of the control unit 101, the notification image generating unit 300 generates a focus degree notification image by superimposing a focus degree notification plane onto the preparatory shooting image. In other words, the focus degree notification image is a preparatory shooting image with the focus degree notification plane superimposed thereon. Note that the notification image generating unit 300 can create the focus degree notification plane using any known method. For example, the notification image generating unit 300 may use a method for creating the focus degree notification plane on the basis of an edge detection result, as disclosed in Japanese Patent Laid-Open No. 2016-92596.

In step S1003, the control unit 101 displays an image in the display unit 109. Specifically, when the motion blur notification image has been generated in step S204 (when it has been determined in step S1001 that the "motion blur notification on" notification mode is to be used), the control unit 101 displays the motion blur notification image (the preparatory shooting image onto which the motion blur notification plane has been superimposed) in the display unit 109. When the focus degree notification image has been generated in step S1002 (when it has been determined in step S1001 that the "focus degree notification on" notification mode is to be used), the control unit 101 displays the focus degree notification image (the preparatory shooting image onto which the focus degree notification plane has been superimposed) in the display unit 109. When the motion blur notification image has not been generated (when it has been determined in step S1001 that the "notifications off" notification mode is to be used), the control unit 101 displays the preparatory shooting image (a preparatory shooting image onto which neither notification plane has been superimposed) in the display unit 109.

The determination of the notification mode in step S1001 will be described in detail here. As described earlier, the control unit 101 determines which of the notification modes, namely "motion blur notification on", "focus degree notification on", and "notifications off", to operate in, on the basis of the details of the user operation made in step S202. If the degree of motion blur has been changed by user operations, the control unit 101 determines that the user wishes to confirm the motion blur, and selects "motion blur notification on". For example, if the user is manipulating a Tv dial included in the instruction input unit 110, the degree of motion blur will change in response to changes in the shutter speed. As such, the control unit 101 determines that the user wishes to confirm the motion blur, and selects "motion blur notification on". On the other hand, if the focus has been changed by user operations, the control unit 101 determines that the user wishes to confirm the focus, and selects "focus degree notification on". For example, if the user is manipulating an Av dial, a focus ring, or the like included in the instruction input unit 110, the control unit 101 determines that the user wishes to confirm the focus, and selects "focus degree notification on". If the user is adjusting the ISO sensitivity, neither the motion blur nor the focus will change. As such, the control unit 101 determines that neither the motion blur nor the focus need be confirmed, and selects "notifications off". Thus switching the notification mode ("motion blur notification on", "focus degree notification on", or "notifications off") dynamically in accordance with the details of the user operations makes it possible to provide shooting assistance at an appropriate timing.

According to the second embodiment as described thus far, the image capturing apparatus 100 detects the motion amount of an object from an image obtained through preparatory shooting, and converts the motion amount to a motion blur amount arising during actual shooting. Additionally, the image capturing apparatus 100 determines whether to make the motion blur notification or a second notification that is different from the motion blur notification (the focus degree notification, in the above example) on the basis of predetermined notification condition(s). If it has been determined that the motion blur notification is to be made, the image capturing apparatus 100 notifies the user of motion blur on the basis of the motion blur amount, whereas if it has been determined that the second notification is to be made, the image capturing apparatus 100 makes the second notification. The "predetermined notification condition(s)" for determining whether to make the motion blur notification or the second notification are the details of the user operations for changing the shooting condition(s) for the actual shooting, for example. In the example described above, the image capturing apparatus 100 determines that the motion blur notification is to be made if the user had made an operation for changing the exposure time in the actual shooting (e.g., manipulating the Tv dial included in the instruction input unit 110). Additionally, if a user operation for changing the aperture value or focus in the actual shooting has been made (e.g., manipulating an Av dial, a focus ring, or the like included in the instruction input unit 110), the image capturing apparatus 100 determines that the focus degree notification is to be made. This makes it possible to make a motion blur notification based on the situation. This also makes it possible to make different types of notifications depending on the circumstances.

Although FIG. 10 illustrates a configuration in which the notification mode ("motion blur notification on", "focus degree notification on", or "notifications off") is switched in accordance with the details of a user operation, the basis for switching the notification mode (the predetermined notification condition(s)) are not limited thereto. For example, if the object being shot is moving in a planar direction (a direction orthogonal to the optical axis of the shooting optical system), the control unit 101 may determine that the user wishes to confirm motion blur, and select "motion blur notification on". Additionally, if the object being shot is moving in a depth direction (the direction of the optical axis of the shooting optical system), the control unit 101 may determine that the user wishes to confirm the focus, and select "focus degree notification on". Finally, if the object being shot is not in focus by greater than or equal to a predetermined degree (if the focus is less than a threshold), the control unit 101 may determine that the user prioritizes confirming the focus, and select "focus degree notification on".

Whether the object is moving in a planar direction or a depth direction can be determined by using a motion vector and distance information, for example. With respect to the motion vector, the control unit 101 calculates the motion vector using the calculation method described in the first embodiment. Then, the control unit 101 uses the magnitude of the calculated motion vector as the movement amount in the planar direction. With respect to the distance information, the control unit 101 calculates distance information of the object in both the Mth frame and the M+1th frame on the basis of image capturing surface phase difference information, as will be described later. The control unit 101 then uses a difference between these instances of the distance information as the movement amount in the depth direction. The control unit 101 compares the movement amount calculated for the 2 directions, determines that the object is moving in a planar direction when the planar direction movement amount is greater, and determines that the object is moving in a depth direction when the depth direction movement amount is greater.

The control unit 101 can obtain the image capturing surface phase difference information from an A image and a B image, which will be described later in the third embodiment with reference to FIGS. 16A and 16B. Specifically, the control unit 101 detects a phase difference on the basis of a correlation computation carried out between the A image and the B image. The control unit 101 then calculates the distance information on the basis of the detected phase difference.

If the exposure setting is set to "auto" in the image capturing apparatus 100, there are situations where the shutter speed and the focus change simultaneously. In such a case, the image capturing apparatus 100 may be configured so that whether to prioritize displaying the motion blur notification or the focus degree notification can be set in advance. This makes it possible to make notifications that match the user's preferences.

Although the present embodiment describes a configuration for switching between the motion blur notification and the focus degree notification, the notification is not limited to the focus degree notification, and a configuration that switches to another notification may be employed instead. For example, the control unit 101 may switch between the motion blur notification and a saturation degree notification. In this case, in step S1001 of FIG. 10, the control unit 101 determines which of the notification modes, namely "motion blur notification on", "saturation degree notification on", and "notifications off", to operate in, on the basis of the details of the user operation made in step S202. The process moves to step S204 when the mode is "motion blur notification on"; to step S1002, when the mode is "saturation degree notification on"; and to step S1003, when the mode is "notifications off". In step S1003, a process for generating a saturation degree notification image is carried out instead of the process for generating a focus degree notification image. Additionally, the control unit 101 may determine the notification mode taking into account the area of a saturated region present in the image, in addition to the details of the user operations, motion of the object, and so on. For example, the control unit 101 may select "saturation degree notification on" when the percentage of the image obtained in the actual shooting that is taken up by the saturated area will be greater than or equal to a threshold.

Although the present embodiment describes a configuration that switches between the motion blur notification and the focus degree notification in accordance with the details of user operations, motion of an object, and so on, a configuration may be employed in which a notification switching member such as a switching button is provided, and the switch is carried out in accordance with a user instruction made by manipulating the switching button. For example, the control unit 101 may cycle the notification mode from "motion blur notification on", to "focus degree notification on", to "notifications off", and back again, each time the user presses the switching button. When shooting an object that continues to move intermittently, such as a child, it is conceivable that the user will adjust the shutter speed so that no motion blur will arise, quickly adjust the focus, and then take a shot. Accordingly, employing a configuration in which the notification mode is switched in this order improves the operability. Alternatively, the control unit 101 may cycle the notification mode from "focus degree notification on", to "motion blur notification on", to "notifications off", and back again, each time the user presses the switching button. For example, when shooting a train while panning, it is conceivable that the user will first focus on the train, and will then set the shutter speed in consideration of the motion blur before taking the shot. Accordingly, employing a configuration in which the notification mode is switched in this order improves the operability.

Third Embodiment

As described in the Description of the Related Art, shooting an image with little motion blur requires a fast shutter speed. As such, making a notification that assists the user in setting the shutter speed improves the operability.

However, it is necessary to open the lens aperture or increase the ISO sensitivity in order to maintain the same level of exposure while increasing the shutter speed. For example, if, when the user increases the shutter speed to reduce motion blur, he or she opens the aperture in order to maintain the same level of exposure, objects that are not at the position of focus will become blurry, which can result in an image having bokeh which the user does not desire. Thus depending on the circumstances, the user may wish to have a bokeh notification instead of, or in addition to, the motion blur notification.

In light of such circumstances, the third embodiment will describe a configuration in which a priority level is determined for the motion blur notification and the bokeh notification, and one or both of the motion blur notification and the bokeh notification are made in accordance with the priority levels. The "bokeh notification" refers to notifying the user of bokeh in an image on the basis of information of bokeh produced by the shooting optical system. In the third embodiment, the basic configuration of the image capturing apparatus 100 is the same as in the first embodiment (see FIG. 1). The following will primarily describe areas that are different from the first embodiment.

In the third embodiment, the image capturing unit 105 includes an image sensor having pupil-division pixels, which will be described later. Furthermore, the image processing unit 107 includes a notification image generating unit 1200 (described later) instead of the notification image generating unit 300. The image processing unit 107 generates a motion blur/bokeh notification image by superimposing an image plane, in which motion blur and bokeh produced by the optical system can be easily confirmed, on an image stored in the RAM 103.

Figure 11:
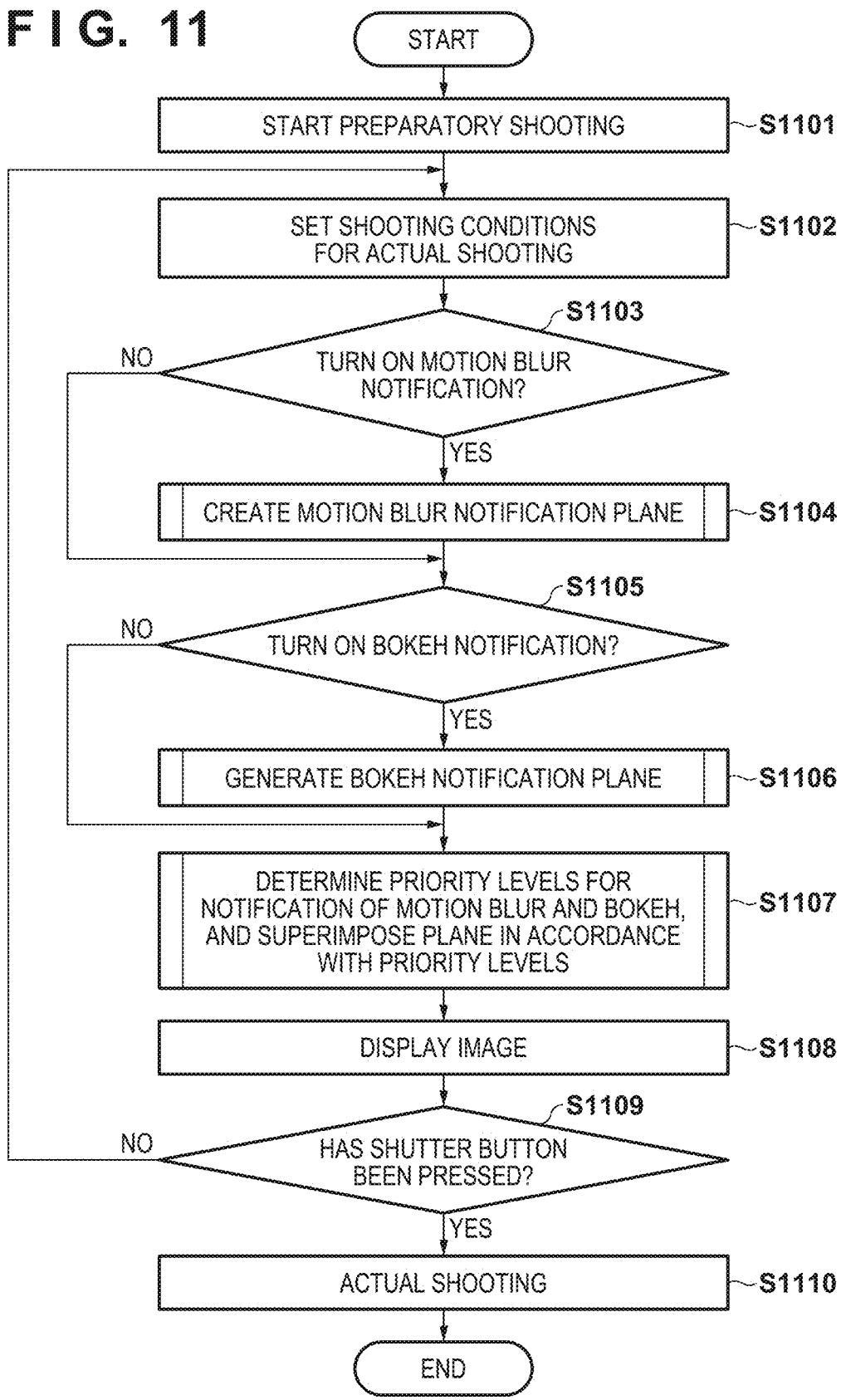
FIG. 11 is a flowchart illustrating a shooting process according to a third embodiment.

A shooting process executed by the image capturing apparatus 100 will be described next with reference to FIG. 11. Unless otherwise specified, the processes in the respective steps of this flowchart are realized by the control unit 101 executing the aforementioned control programs. The processing illustrated in this flowchart starts when the user turns the image capturing apparatus 100 on and an operating mode of the image capturing apparatus 100 enters a shooting mode.

In step S1101, the control unit 101 starts preparatory shooting. During the period of the preparatory shooting, the image capturing apparatus 100 captures images in sequence (the preparatory shooting image), and displays that image in the display unit 109. The user composes the shot and so on while viewing the display preparatory shooting image. Note that the processes of steps S1102 to S1109 (described hereinafter) are carried out during the period of preparatory shooting.

In step S1102, the control unit 101 sets shooting conditions for actual shooting in response to user instructions made using the instruction input unit 110. The shooting conditions include exposure conditions, and the exposure conditions include the shutter speed, ISO sensitivity, F-stop value, and so on.

In step S1103, the control unit 101 determines whether to turn the motion blur notification on or off. Turning the motion blur notification on or off can be set by the user using the instruction input unit 110, for example. When the user sets the motion blur notification on or off, a setting value indicating on or off is held in the RAM 103. The control unit 101 determines whether to turn the motion blur notification on or off in accordance with this setting value. If it has been determined that the motion blur notification is to be turned on, the process moves to step S1104, and if not, the process moves to step S1105.

In step S1104, under the control of the control unit 101, the notification image generating unit 1200 generates the motion blur notification plane for superimposing onto the preparatory shooting image. The process of step S1104 will be described in detail later with reference to FIG. 13.

In step S1105, the control unit 101 determines whether to turn a notification of bokeh produced by the optical system (a bokeh notification) on or off. Turning the bokeh notification on or off can be set by the user using the instruction input unit 110, for example. When the user sets the bokeh notification on or off, a setting value indicating on or off is held in the RAM 103. The control unit 101 determines whether to turn the bokeh notification on or off in accordance with this setting value. If it has been determined that the bokeh notification is to be turned on, the process moves to step S1106, and if not, the process moves to step S1107.

In step S1106, under the control of the control unit 101, the notification image generating unit 1200 generates a bokeh notification plane for superimposing onto the preparatory shooting image. The process of step S1106 will be described in detail later with reference to FIG. 14.

In step S1107, under the control of the control unit 101, the notification image generating unit 1200 determines priority levels for the motion blur notification and the bokeh notification, and superimposes one or both of the motion blur notification plane and the bokeh notification plane onto the preparatory shooting image in accordance with the priority levels. The method for determining the priority levels will be described in detail later.

In step S1108, the control unit 101 displays the preparatory shooting image, onto which one or both of the motion blur notification plane and the bokeh notification plane has been superimposed (a notification image) in step S1107, in the display unit 109.

Note that if the motion blur notification is set to off, a preparatory shooting image onto which only the bokeh notification plane is superimposed is displayed as the notification image. Likewise, if the bokeh notification is set to off, a preparatory shooting image onto which only the motion blur notification plane is superimposed is displayed as the notification image. If both the motion blur notification and the bokeh notification are set to off, a preparatory shooting image onto which neither the motion blur notification plane nor the bokeh notification plane are superimposed is displayed.

In step S1109, the control unit 101 determines whether or not the user has pressed a shutter button. The shutter button is included in the instruction input unit 110, for example. If the shutter button has been pressed, the process moves to step S1110, and if not, the process returns to step S1102.

The user can easily confirm motion blur during the preparatory shooting when the preparatory shooting image onto which the motion blur notification plane has been superimposed is being displayed in the display unit 109. If the motion blur the user has confirmed is not motion blur that meets his or her preferences, the user can avoid pressing the shutter button, which returns the process to step S1102 and makes it possible to change (reset) the shutter speed (exposure time) for the actual shooting.

Likewise, the user can easily confirm bokeh produced by the optical system during the preparatory shooting when the preparatory shooting image onto which the bokeh notification plane has been superimposed is being displayed in the display unit 109. If the bokeh the user has confirmed is not bokeh that meets his or her preferences, the user can avoid pressing the shutter button, which returns the process to step S1102 and makes it possible to change (reset) the aperture value (F-stop value) for the actual shooting.

After setting his or her desired shutter speed and aperture value, the user can also control the exposure by changing the ISO sensitivity. Additionally, if a preparatory shooting image onto which both the motion blur notification plane and the bokeh notification plane are superimposed is being displayed in the display unit 109, the user can change (reset) the shutter speed, the F-stop value, and the ISO sensitivity so as to achieve motion blur/bokeh that meet his or her preferences.

In this manner, during preparatory shooting, the user can repeatedly change the shutter speed, F-stop value, and ISO sensitivity for the actual shooting until his or her preferred motion blur/bokeh is achieved, while confirming the preparatory shooting image, displayed in the display unit 109, onto which the motion blur notification plane and the bokeh notification plane are superimposed; the user can then press the shutter button when he or she has a chance to take a shot.

When the shutter button is pressed in step S1109, the control unit 101 carries out actual shooting, and records the image from the actual shooting in the recording unit 108, in step S1110.

An example of the configuration of the notification image generating unit 1200 included in the image processing unit 107 according to the third embodiment will be described next with reference to FIG. 12.

The notification image generating unit 1200 includes a motion vector calculation unit 1201, a motion blur calculation unit 1202, a motion blur notification plane generation unit 1203, a bokeh amount calculation unit 1204, a bokeh notification plane generation unit 1205, a notification priority level determination unit 1206, and an image superimposing unit 1207. The operations of the notification image generating unit 1200 will be described in detail later with reference to FIG. 13.

Figure 13:
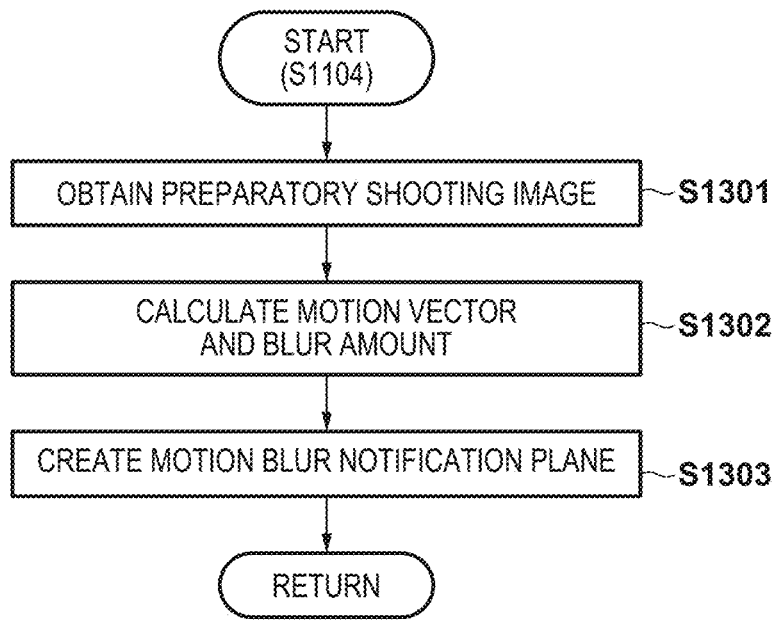
FIG. 13 is a flowchart illustrating a process for generating a blur notification plane (step S1104 in FIG. 11).

Next, the process by which the notification image generating unit 1200 generates the motion blur notification plane (step S1104 in FIG. 11) will be described in detail with reference to FIG. 13.

In step S1301, the notification image generating unit 1200 obtains the preparatory shooting image captured during the preparatory shooting by the image capturing apparatus 100. The obtained preparatory shooting image is input to the motion vector calculation unit 1201 and the image superimposing unit 1207. FIG. 5A will be used as an example of the preparatory shooting image, in the same manner as in the first embodiment.

In step S1302, the motion vector calculation unit 1201 calculates a motion vector between the preparatory shooting images as motion information, and the motion blur calculation unit 1202 converts the calculated motion vector into a motion blur amount. The method for calculating the motion vector is the same as the calculation method described in the first embodiment (step S402 in FIG. 4). However, in step S1302, the process for converting the calculated motion vector into a motion blur amount is carried out in addition to the process for calculating a motion vector. In the present embodiment, the magnitude of the motion vector is the motion blur amount itself, in units of pixels. The motion vector and the motion blur amount are calculated on a pixel-by-pixel basis.

Incidentally, although the process for converting the motion vector into the motion blur for the actual shooting (steps S403 and S404) are carried out after the motion vector calculation process (step S402) in the first embodiment, the process for converting the motion vector into motion blur for the actual shooting is not carried out in the present embodiment. Instead, in the present embodiment, a process for converting the calculated motion vector into a motion blur amount is carried out. However, in the present embodiment, the process for converting the motion vector into the motion blur for the actual shooting (steps S403 and S404) may be carried out, in the same manner as in the first embodiment. In this case, the notification image generating unit 1200 includes the converted motion blur calculation unit 302 instead of the motion blur calculation unit 1202.

In step S1303, the motion blur notification plane generation unit 1203 creates an image plane for notifying the user of the motion blur (the motion blur notification plane) on the basis of the motion blur for each pixel, calculated in step S1302. Aside from the motion blur being used instead of the converted motion blur, the method for creating the motion blur notification plane is the same as the creation method described in the first embodiment with reference to FIGS. 9A to 9C.

Next, the process by which the notification image generating unit 1200 generates the bokeh notification plane (step S1106 in FIG. 11) will be described in detail with reference to FIG. 14.

In step S1401, the notification image generating unit 1200 obtains a parallax image corresponding to the preparatory shooting image captured during the preparatory shooting by the image capturing apparatus 100. The obtained parallax image is input to the bokeh amount calculation unit 1204. The process for obtaining the parallax image will be described in detail later with reference to FIGS. 16A and 16B.

In step S1402, the bokeh amount calculation unit 1204 calculates a bokeh amount produced by the optical system in the preparatory shooting image, as bokeh information. The bokeh amount is calculated on a pixel-by-pixel basis. The method for calculating the bokeh amount will be described in detail later with reference to FIGS. 16A, 16B, and 17.

In step S1403, the bokeh notification plane generation unit 1205 generates an image plane for notifying the user of the bokeh (the bokeh notification plane) on the basis of the bokeh amount calculated for each pixel in step S1402.

Figure 15A:
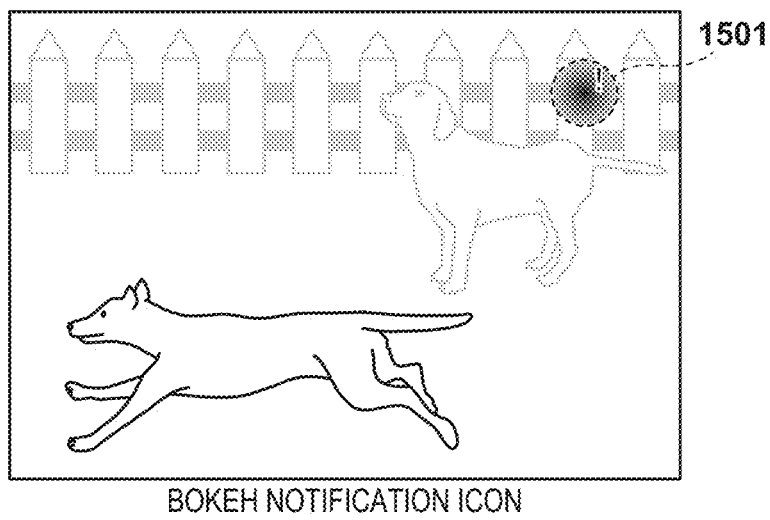
FIGS. 15A to 15C are diagrams illustrating three examples of the bokeh notification plane.
Figure 15B:
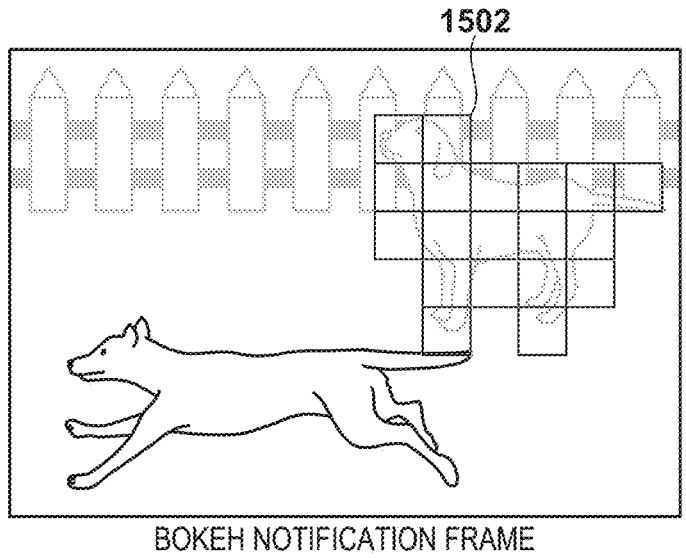
Figure 15C:
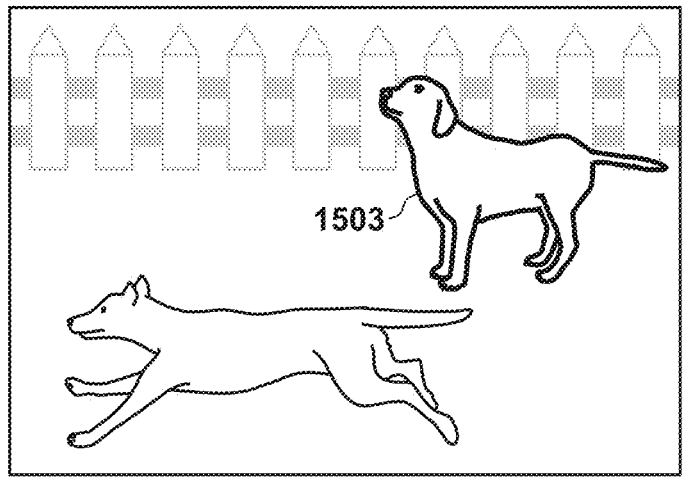

A display carried out when notifying the user of only the bokeh will be described in detail here with reference to FIGS. 15A to 15C. FIGS. 15A to 15C are diagrams illustrating three examples of the bokeh notification plane. In FIGS. 15A to 15C, it is assumed that the dog in the lower-left part of the screen is in focus, and the dog in the upper-right part of the screen is behind the focus position. Displaying a preparatory shooting image onto which the bokeh notification plane is superimposed in the display unit 109 during the preparatory shooting makes it possible for the user to easily confirm the bokeh produced by the optical system.

FIG. 15A illustrates an example of notifying the user of the bokeh by displaying an icon. A method for generating the bokeh notification plane by displaying an icon will be described here. In step S1403, of the bokeh amounts for each pixel, the bokeh notification plane generation unit 1205 calculates the percentage of the number of pixels having a bokeh amount of a predetermined value or higher, with respect to the entire screen. If the percentage is greater than or equal to a predetermined percentage, the bokeh notification plane generation unit 1205 creates a bokeh notification icon 1501, such as that indicated in FIG. 15A, as the bokeh notification plane. A bokeh notification image such as that illustrated in FIG. 15A is obtained by superimposing the bokeh notification plane onto the preparatory shooting image. At this time, the bokeh notification icon 1501 has a different appearance from the motion blur notification icon 901 (FIG. 9A) so that the motion blur notification icon 901 and the bokeh notification icon 1501 can be distinguished from each other. The notification image generating unit 1200 may be configured to superimpose the bokeh notification icon 1501 and the motion blur notification icon 901 over different locations.

FIG. 15B illustrates an example of notifying the user of the bokeh by displaying frames. A method for generating the bokeh notification plane by displaying frames will be described here. In step S1403, of the pixels within divided regions of the shooting screen, the bokeh notification plane generation unit 1205 calculates the percentage of the number of pixels having a bokeh amount of a predetermined value or higher, with respect to the overall divided regions. For divided regions in which that percentage is greater than or equal to a predetermined percentage, the bokeh notification plane generation unit 1205 creates bokeh notification frames 1502, as illustrated in FIG. 15B, as the bokeh notification plane. A bokeh notification image such as that illustrated in FIG. 15B is obtained by superimposing the bokeh notification plane onto the preparatory shooting image. At this time, the bokeh notification frames 1502 and the motion blur notification frames 902 (FIG. 9B) may be configured with different frame colors, line types, and so on so that the motion blur notification frames 902 and the bokeh notification frames 1502 can be distinguished from each other.

FIG. 15C illustrates an example of notifying the user of the bokeh by displaying edges in which bokeh has arisen in an enhanced manner. A method for generating the bokeh notification plane by displaying edges in which bokeh has arisen in an enhanced manner will be described here. In step S1403, the bokeh notification plane generation unit 1205 detects the edge strength of the preparatory shooting image. It is assumed that the edge strength is calculated using a known technique such as a Sobel filter, so this will not be described here. The bokeh notification plane generation unit 1205 then extracts pixels for which the edge strength is greater than or equal to a predetermined value and for which the bokeh amount is greater than or equal to a predetermined value. The bokeh notification plane generation unit 1205 then creates a bokeh notification plane, in which edge regions where bokeh has arisen are displayed in an enhanced manner for the extracted pixels, as indicated by a bokeh notification edge 1503 in FIG. 15C. A bokeh notification image such as that illustrated in FIG. 15C is obtained by superimposing the bokeh notification plane onto the preparatory shooting image. FIG. 15C illustrates an example in which the bokeh notification edge 1503 is displayed at a bolder weight than the other edges. An enhanced display in which pixels having an edge strength greater than or equal to a predetermined value and having a bokeh amount greater than or equal to a predetermined value are extracted, and the extracted pixels are colored with a specific color, can be given as another example of the enhanced display method. At this time, the enhanced displays of the bokeh notification edge 1503 and the motion blur notification edge 903 (FIG. 9C) may be made in different formats (e.g., colors) so that the motion blur notification edge 903 and the bokeh notification edge 1503 can be distinguished from each other.

Here, the process for obtaining the parallax image (step S1401 in FIG. 14) and the process for calculating the bokeh amount (step S1402 in FIG. 14) will be described in detail with reference to FIGS. 16A, 16B, and 17. In the present embodiment, the bokeh amount is calculated from the parallax image.

Figure 16A:
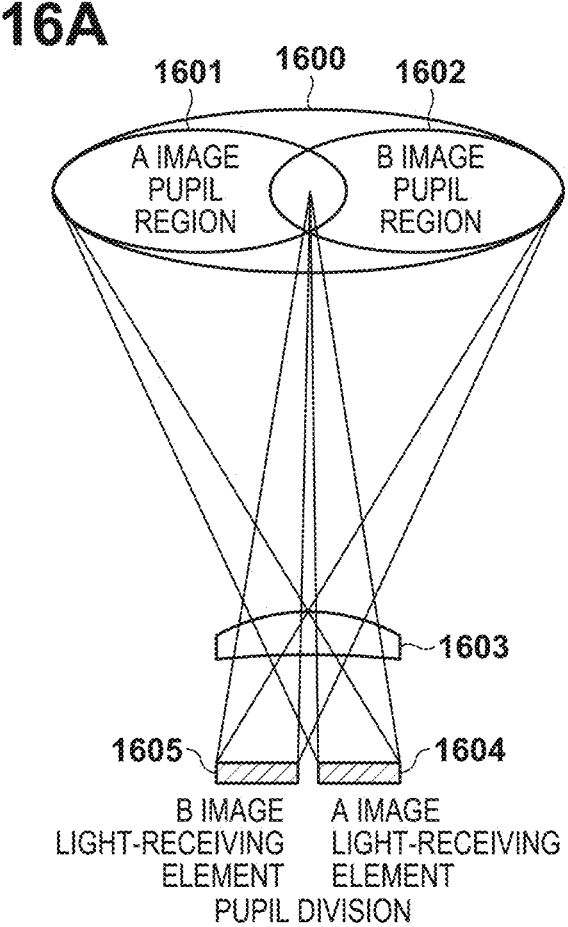
FIGS. 16A and 16B are diagrams illustrating, in a simplified manner, the configuration of a single pixel in an image sensor for obtaining a parallax image.

FIG. 16A is a diagram illustrating, in a simplified manner, the configuration of a single pixel in an image sensor for obtaining the parallax image. 1600 indicates an exit pupil of a shooting lens, 1601 indicates an A image pupil region, 1602 indicates a B image pupil region, 1603 indicates a microlens directly above a light-receiving element of the image sensor, 1604 indicates an A image light-receiving element, and 1605 indicates a B image light-receiving element. The A image light-receiving element 1604 receives light that has passed through the A image pupil region 1601, and the B image light-receiving element 1605 receives light that has passed through the B image pupil region 1602. Two disparate image signals can thus be obtained by providing sensors, each receiving the light passing through a different pupil region, in a single pixel region. The defocus amount can be estimated, a range image can be generated, and so on from the parallax amount of these image signals. As illustrated in FIG. 16A, a horizontal direction parallax amount can be found when the A image light-receiving element 1604 and the B image light-receiving element 1605 are arranged in the horizontal direction. For the sake of simplicity, FIG. 16A illustrates a configuration where pupil division is achieved using two light-receiving elements, namely the A image light-receiving element 1604 and the B image light-receiving element 1605, a single pixel can be constituted by more light-receiving elements as well. The present embodiment assumes that a single pixel is constituted by four light-receiving elements, as illustrated in FIG. 16B.

Figure 16B:
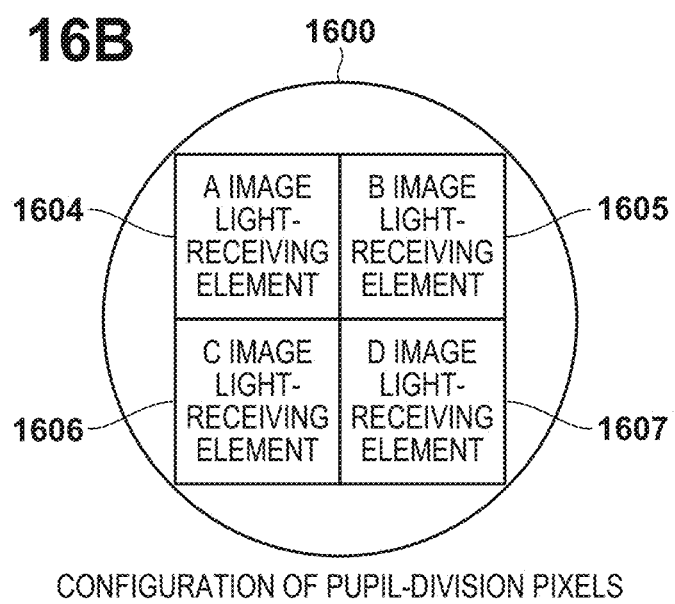

In FIG. 16B, 1600 indicates a microlens, 1604 indicates an A image light-receiving element, 1605 indicates a B image light-receiving element, 1606 indicates a C image light-receiving element, and 1607 indicates a D image light-receiving element. The A-D light-receiving elements receive light that has passed through four mutually-different pupil regions. With a parallax detection pixel such as that illustrated in FIG. 16B, four image signals, namely an A image, a B image, a C image, and a D image, can be obtained by capturing a single image. Consider a situation where the A image light-receiving element 1604, the B image light-receiving element 1605, the C image light-receiving element 1606, and the D image light-receiving element 1607 are arranged in the horizontal and vertical directions to form a grid, as illustrated in FIG. 16B. In this case, the horizontal direction parallax amount can be found using an A+C image obtained by finding the arithmetic mean of the A image and the C image, and a B+D image obtained by finding the arithmetic mean of the B image and the D image. Likewise, the vertical direction parallax amount can be found using an A+B image obtained by finding the arithmetic mean of the A image and the B image, and a C+D image obtained by finding the arithmetic mean of the C image and the D image.

Figure 12:
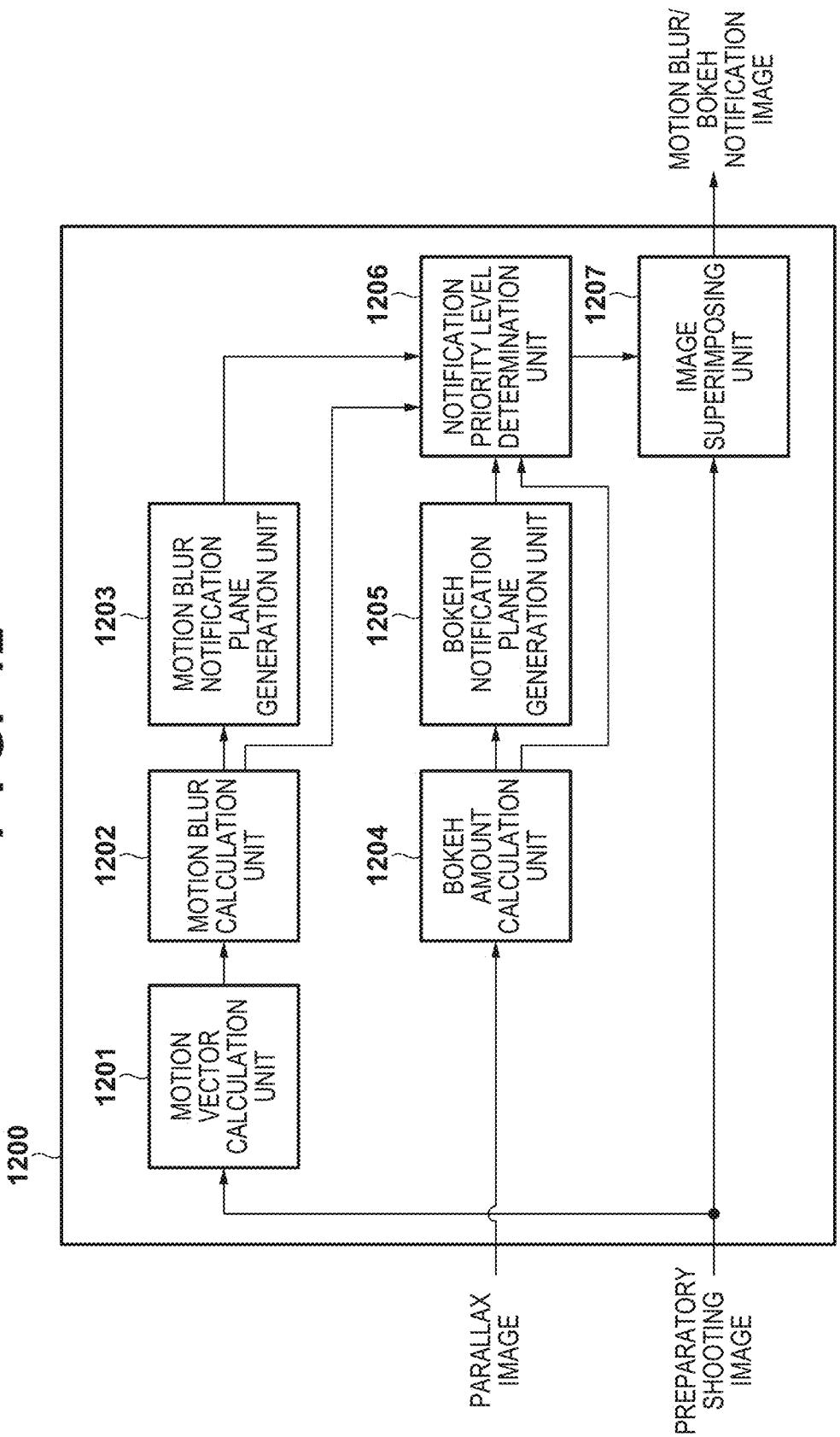
FIG. 12 is a diagram illustrating an example of the configuration of a notification image generating unit 1200 included in the image processing unit 107 according to the third embodiment.

Note that the preparatory shooting image input to the motion vector calculation unit 1201 and the image superimposing unit 1207, illustrated in FIG. 12, is an image obtained by finding the arithmetic mean of the A image, the B image, the C image, and the D image, and is the same image as that obtained when receiving light using an image sensor not configured for pupil division.

Figure 14:
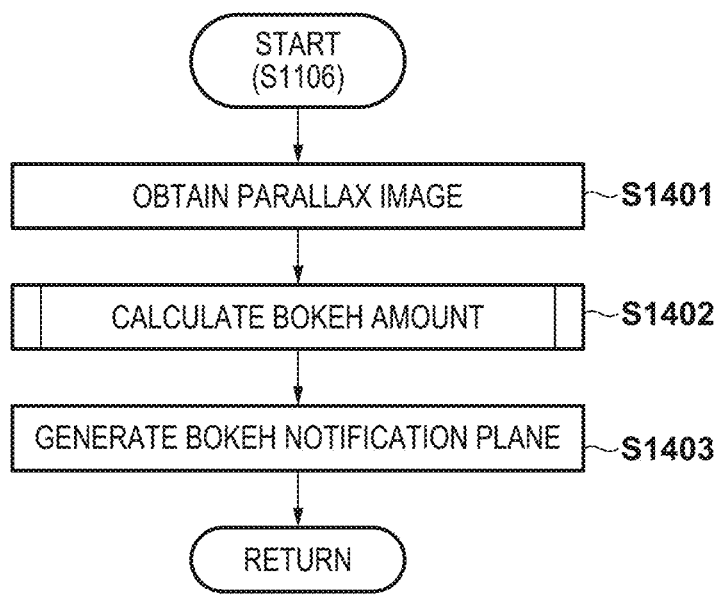
FIG. 14 is a flowchart illustrating a process for generating a bokeh notification plane (step S1106 in FIG. 11).

FIG. 17 is a flowchart illustrating, in detail, the bokeh amount calculation process carried out by the bokeh amount calculation unit 1204 (step S1402 in FIG. 14).

In step S1701, the bokeh amount calculation unit 1204 obtains the A image, the B image, the C image, and the D image corresponding to the parallax image input in step S1401 of FIG. 14.

In step S1702, the bokeh amount calculation unit 1204 generates the A+C image, the B+D image, the A+B image, and the C+D image through arithmetic mean processing.

In step S1703, the bokeh amount calculation unit 1204 sets a base pixel in the A+C image. In step S1704, the bokeh amount calculation unit 1204 calculates a horizontal parallax amount between the A+C image and the B+D image. A method such as that disclosed in Japanese Patent Laid-Open No. 2008-15754, for example, can be used to calculate the parallax amount. Specifically, the bokeh amount calculation unit 1204 calculates the parallax amount by shifting the relative horizontal positional relationship between the A+C image and the B+D image, and finding a pixel shift amount when the correlation between the image signals is the highest. The horizontal parallax amount between the A+C image and the B+D image calculated in this manner is represented by Lh.

In step S1705, the bokeh amount calculation unit 1204 sets a base pixel in the A+B image. In step S1706, the bokeh amount calculation unit 1204 calculates a vertical parallax amount between the A+B image and the C+D image. The same method as that used in step S1704 can be used to calculate the parallax amount. Specifically, the bokeh amount calculation unit 1204 calculates the parallax amount by shifting the relative vertical positional relationship between the A+B image and the C+D image, and finding a pixel shift amount when the correlation between the image signals is the highest. The vertical parallax amount between the A+B image and the C+D image calculated in this manner is represented by Lv.

In step S1707, the bokeh amount calculation unit 1204 calculates the bokeh amount from the horizontal parallax amount and the vertical parallax amount. Specifically, assuming the bokeh amount is represented by G, the bokeh amount calculation unit 1204 calculates the bokeh amount according to the following Equation (3). The unit of the bokeh amount is pixels.

$$G=\sqrt{(Lh^2+Lv^2)} \quad (3)$$

In step S1708, the bokeh amount calculation unit 1204 determines whether or not the bokeh amount calculation is complete for all of the pixels within the screen. The process of the flowchart ends if the bokeh amount calculation is complete for all of the pixels in the screen. If not, the process returns to step S1703, where the bokeh amount calculation unit 1204 takes a pixel for which the bokeh amount has not yet been calculated as the base pixel, and then carries out the processing of steps S1703 to S1707. Thereafter, the bokeh amount calculation unit 1204 calculates the bokeh amount at all pixel positions while moving the base pixel in this manner. The bokeh amount calculated on a pixel-by-pixel basis in this manner is used to create the bokeh notification plane described with reference to FIGS. 15A to 15C.

Although the parallax amounts are used to calculate the bokeh amount in the present embodiment, the bokeh amount may be calculated using another method. For example, if the aperture has been opened during the preparatory shooting, a difference between the parallax amount before opening the aperture and the parallax amount after opening the aperture (the amount by which the bokeh amount changes in response to the aperture value changing) may be used as the bokeh amount. Specifically, the greater the parallax amount is compared to the previous frame, a greater bokeh amount is indicated. This makes it possible to notify the user of the bokeh when the amount by which the bokeh changes in response to changes in the aperture during preparatory shooting is high.

If the parallax image cannot be obtained, the bokeh amount calculation unit 1204 may calculate the bokeh amount without using parallax information. For example, if the aperture has been opened during the preparatory shooting, the bokeh amount calculation unit 1204 may use a change in the edge strength of the preparatory shooting image between before opening the aperture and after opening the aperture to calculate the bokeh amount. Specifically, the greater the amount by which the edge strength decreases from the previous frame, a greater bokeh amount is indicated.

Next, a process by which the notification image generating unit 1200 determines the notification priority level, and superimposes one or both of the motion blur notification plane and the bokeh notification plane, on the preparatory shooting image in accordance with the priority level (step S1107 of FIG. 11), will be described in detail with reference to FIG. 18.

In step S1801, the notification priority level determination unit 1206 determines whether or not the percentage of the overall shooting screen taken up by the number of pixels having a motion blur amount greater than or equal to a threshold is greater than or equal to a predetermined percentage (greater than or equal to a threshold). If the percentage is greater than or equal to the threshold, the process moves to step S1808, whereas if the percentage is less than the threshold, the process moves to step S1802. For example, when the image capturing apparatus 100 is panning, many objects are moving in the screen, and so on, the percentage of the overall shooting screen taken up by the number of pixels having a motion blur amount greater than or equal to a threshold is greater than or equal to the predetermined percentage, and the process therefore moves to step S1808. In this case, the notification priority level determination unit 1206 outputs, to the image superimposing unit 1207, a priority level indicating that the motion blur notification plane should be prioritized for the entire screen. The image superimposing unit 1207 then superimposes the motion blur notification plane on the preparatory shooting image, without superimposing the bokeh notification plane. In this manner, in scenes where the motion blur has a major effect, only the motion blur notification is made to the user, and the bokeh notification is not made.

In step S1802, the notification priority level determination unit 1206 determines whether or not the aperture value has changed during the preparatory shooting. If the aperture value has changed, the process moves to step S1803, whereas if the aperture value has not changed, the process moves to step S1808. If the aperture value has not changed during the preparatory shooting, it is unlikely that bokeh not intended by the user will arise, and thus the notification priority level determination unit 1206 outputs, to the image superimposing unit 1207, a priority level indicating that the motion blur notification plane should be prioritized for the entire screen. As a result, only the motion blur notification is made for the user through the process of step S1808, and the bokeh notification is not made. On the other hand, if the aperture value has changed, it is possible that bokeh not intended by the user has arisen. As such, the notification priority level determination unit 1206 determines the priority level in accordance with a magnitude relationship between the motion blur amount and the bokeh amount, using a method that will be described later.

In step S1803, the notification priority level determination unit 1206 sets a base pixel in the preparatory shooting image. In step S1804, the notification priority level determination unit 1206 determines whether or not the motion blur amount is greater than the bokeh amount in the base pixel. The motion blur amount is the motion blur amount calculated by the motion blur calculation unit 1202, and is the movement amount from the previous frame. The bokeh amount is the bokeh amount calculated from the parallax amount by the bokeh amount calculation unit 1204, or the bokeh amount calculated from the difference from the parallax amount in the previous frame. The units of both the motion blur amount and the bokeh amount are "pixels". If the bokeh amount is greater than the motion blur amount, the process moves to step S1805, and if not, the process moves to step S1806.

In step S1805, the notification priority level determination unit 1206 outputs, to the image superimposing unit 1207, a priority level indicating that the motion blur notification plane should be prioritized for the base pixel. The image superimposing unit 1207 then preferentially superimposes the motion blur notification plane on the base pixel in the preparatory shooting image. In other words, the motion blur notification is made preferentially for pixels, in the shooting screen, in which the motion blur amount is greater than the bokeh amount.

In step S1806, the notification priority level determination unit 1206 outputs, to the image superimposing unit 1207, a priority level indicating that the bokeh notification plane should be prioritized for the base pixel. The image superimposing unit 1207 then preferentially superimposes the bokeh notification plane on the base pixel in the preparatory shooting image. In other words, the bokeh notification is made preferentially for pixels, in the shooting screen, in which the bokeh amount is greater than the motion blur amount.

In step S1807, the notification priority level determination unit 1206 determines whether or not the priority level has been successfully determined for all of the pixels in the shooting screen. The process of the flowchart ends if the priority level has been successfully determined for all of the pixels in the shooting screen. If not, the process returns to step S1803, where the notification priority level determination unit 1206 takes a pixel for which the priority level has not yet been determined as the base pixel, and then carries out the processing of steps S1803 to S1806. Thereafter, the notification priority level determination unit 1206 determines the priority level at all pixel positions while moving the base pixel in this manner. A preparatory shooting image in which the superimposing process has been carried out according to the priority level at all pixel positions (the motion blur/bokeh notification image) is obtained as a result. The preparatory shooting image (motion blur/bokeh notification image) obtained in this manner is displayed in the display unit 109 in step S1107 of FIG. 11.

As can be understood from steps S1803 to S1806, the user is preferentially notified of the greater of the motion blur amount and the bokeh amount for pixels where both motion blur and bokeh are present. Thus according to the present embodiment, the user can be notified as to whether motion blur or bokeh will have a greater effect on the image.

Figure 18:
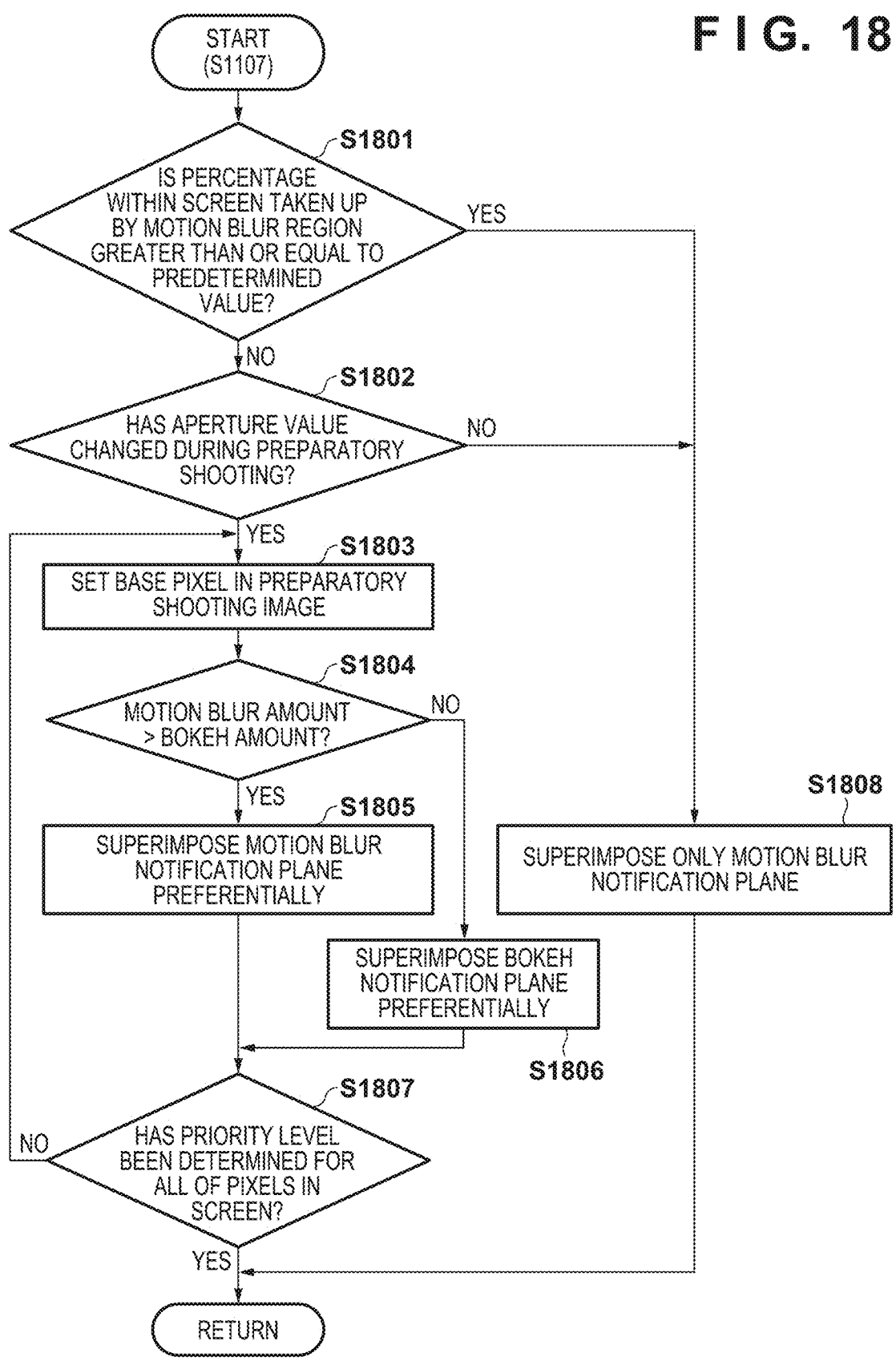
FIG. 18 is a flowchart illustrating a process for determining a notification priority level, and superimposing one or both of the motion blur notification plane and the bokeh notification plane, on the preparatory shooting image in accordance with the priority level (step S1107 of FIG. 11).

Although not illustrated in FIG. 18, depending on the circumstances, the notification priority level determination unit 1206 may output, to the image superimposing unit 1207, a priority level indicating that the bokeh notification plane is to be prioritized for the entire screen. For example, when it is unlikely that motion blur will arise (e.g., when the shutter speed is greater than or equal to a threshold), the notification priority level determination unit 1206 outputs, to the image superimposing unit 1207, a priority level indicating that the bokeh notification plane is to be prioritized for the entire screen. In this case, the image superimposing unit 1207 then superimposes the bokeh notification plane on the preparatory shooting image, without superimposing the motion blur notification plane. As a result, only the bokeh notification is made for the user, and the motion blur notification is not made.

According to the third embodiment as described thus far, the image capturing apparatus 100 obtains the motion blur amount of an object, and the bokeh amount produced by the shooting optical system, from an image obtained through preparatory shooting. Then, the image capturing apparatus 100 determines a priority level for the motion blur notification and the bokeh notification, and one or both of the motion blur notification and the bokeh notification are made in accordance with the priority levels. This makes it possible to make a motion blur notification and a bokeh notification in accordance with the situation.

Figure 19:
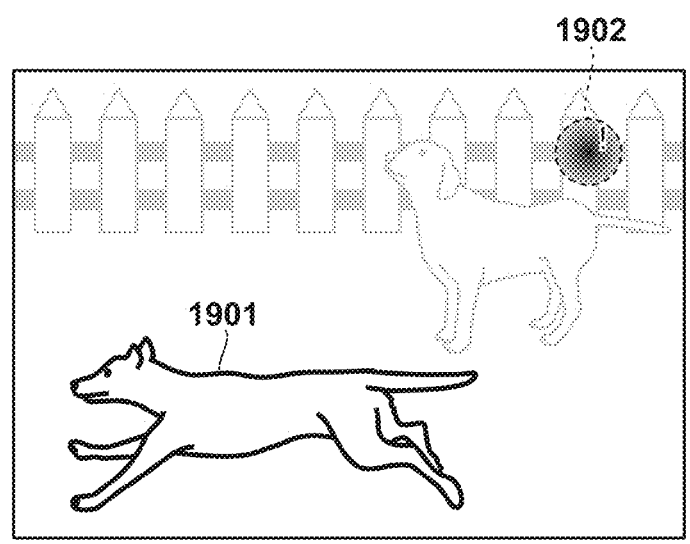
FIG. 19 is a diagram illustrating an example of carrying out the motion blur notification and the bokeh notification in different formats.

The present embodiment describes three examples of methods for making the bokeh notification, namely an icon display, a frame display, and an enhanced edge display. Furthermore, the first embodiment, which is referred to in the present embodiment, described three examples of methods for making the motion blur notification, namely an icon display, a frame display, and an enhanced edge display. Here, it is not necessary to use the same notification methods for both the motion blur notification and the bokeh notification. For example, the enhanced edge display may be used for the motion blur notification, and the icon display may be used for the bokeh notification. The notifications may be made using other combinations as well. For example, in the example illustrated in FIG. 19, the motion blur notification is made using a motion blur notification edge 1901, and the bokeh notification is made using a bokeh notification icon 1902. Doing so makes it easier for the user to distinguish between the motion blur notification and the bokeh notification.

Additionally, although the present embodiment describes a configuration in which the motion blur/bokeh notification image is displayed in the display unit 109 as the method for notifying the user of motion blur and bokeh, the method for notifying the user is not limited thereto. For example, a configuration in which the user is notified of motion blur and bokeh by sound may be employed. In this case, for example, the control unit 101 may output a motion blur notification sound from a speaker (not shown) when the percentage of the number of pixels having a motion blur of a predetermined value or higher, with respect to the entire screen, is greater than or equal to a predetermined percentage. Likewise, the control unit 101 may output a bokeh notification sound from a speaker (not shown) when the percentage of the number of pixels having a bokeh amount of a predetermined value or higher, with respect to the entire screen, is greater than or equal to a predetermined percentage.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-248374, filed on 28 Dec. 2018, which is hereby incorporated by reference herein in its entirety.

What is claimed is:

1. A notifying apparatus comprising at least one processor and/or at least one circuit which functions as:
   an acquisition unit configured to acquire a first image shooting condition and motion information in first image shooting performed with the first image shooting condition;
   a setting unit configured to set a second image shooting condition;
   an estimation unit configured to estimate motion blur in second image shooting performed with a second image shooting condition, based on the first image shooting condition, the motion information, and the second image shooting condition; and
   a notifying unit configured to control a motion blur notification on the basis of the estimated motion blur according to a user operation for changing a shooting condition.

2. The notifying apparatus according to claim 1, wherein the user operation is for changing a shooting condition of the second image shooting, and the notifying unit controls the motion blur notification on the basis of details of the user operation.

3. The notifying apparatus according to claim 1, wherein the notifying unit makes the motion blur notification when an object in a first shot image obtained by the first image shooting is moving at a speed greater than or equal to a threshold.

4. The notifying apparatus of claim 1, wherein
   the notifying unit is further configured to control a second notification different from the motion blur notification on the basis of a predetermined notification condition.

5. The notifying apparatus according to claim 4, wherein the notifying unit controls to make the motion blur notification or the second notification on the basis of details of a user operation for changing a shooting condition of the second shooting.

6. The notifying apparatus according to claim 5, wherein the notifying unit makes the motion blur notification when the user operation for changing the shooting condition of the second shooting is for changing an exposure time of the second shooting.

7. The notifying apparatus according to claim 5, wherein the second notification is a focus degree notification; and the notifying unit makes the second notification when the user operation for changing the shooting condition of the second shooting is for changing an aperture value of the second shooting.

8. The notifying apparatus according to claim 5, wherein the second notification is a focus degree notification; and the notifying unit makes the second notification when the user operation for changing the shooting condition of the second shooting is for changing focus of the second shooting.

9. The notifying apparatus according to claim 4, wherein the notifying unit makes the motion blur notification when an object in a first shot image obtained by the first image shooting is moving at a speed greater than or equal to a threshold.

10. The notifying apparatus according to claim 4, wherein the notifying unit makes the motion blur notification when an object in a first shot image obtained by the first image shooting is moving in a direction orthogonal to an optical axis of a shooting optical system.

11. The notifying apparatus according to claim 4, wherein the second notification is a focus degree notification; and the notifying unit makes the second notification when an object in a first shot image obtained by the first image shooting is moving in a direction of an optical axis of a shooting optical system.

12. The notifying apparatus according to claim 4, wherein the second notification is a focus degree notification; and the notifying unit makes the second notification when a focus degree of an object in a first shot image obtained by the first image shooting is less than a threshold.

13. The notifying apparatus according to claim 4, wherein the second notification is a saturation degree notification; and the notifying unit makes the second notification when a percentage of a saturated region in an image obtained through the second shooting is greater than or equal to a threshold.

14. The notifying apparatus according to claim 4, wherein the notifying unit controls to make the motion blur notification and/or the second notification in accordance with a user instruction.

15. The notifying apparatus according to claim 1,
   wherein in a case where a user operation for changing an exposure time is performed, the notifying unit makes the motion blur notification.

16. A notifying apparatus comprising at least one processor and/or at least one circuit which functions as:
   an obtaining unit configured to obtain a motion blur amount of an object and a bokeh amount produced by a shooting optical system, from an image obtained through first image shooting, the first image shooting being carried out repeatedly at predetermined intervals of time; and
   a notifying unit configured to control one or both of a motion blur notification and a bokeh notification based on a user operation for changing a shooting condition and a priority level for the motion blur notification based on the motion blur amount.

17. The notifying apparatus according to claim 16, wherein as the motion blur amount, the obtaining unit obtains a motion blur amount that will arise during second shooting by detecting a motion amount of the object from the image obtained through the first image shooting and converting the motion amount on the basis of the predetermined intervals of time and an exposure time used in the second shooting.

18. The notifying apparatus according to claim 16, wherein as the bokeh amount produced by the shooting optical system, the obtaining unit obtains an amount by which the bokeh amount changes in response to a change in an aperture value of the shooting optical system.

19. The notifying apparatus according to claim 16, wherein the at least one processor and/or at least one circuit is further configured to function as:
   a display unit configured to display the image obtained from the first image shooting, wherein the motion blur notification includes displaying, with an enhanced display in a first format, an edge region where motion blur is arising in the image displayed by the display unit,
   wherein the bokeh notification includes displaying, with an enhanced display in a second format different from the first format, an edge region where bokeh produced by the shooting optical system is arising in the image displayed by the display unit.

20. The notifying apparatus according to claim 16, further comprising a determining unit configured to determine whether or not to make a motion blur notification based on a user operation for changing a shooting condition and a priority level for the motion blur notification based on the motion blur amount, and to determine a priority level for a bokeh notification based on the bokeh amount.

21. The notifying apparatus according to claim 20, wherein the determining unit determines which of the motion blur amount and the bokeh amount is greater in each pixel in a shooting screen, and determines the priority levels so that the motion blur notification is made preferentially for pixels in which the motion blur amount is greater than the bokeh amount and the bokeh notification is made preferentially for pixels in which the bokeh amount is greater than the motion blur amount.

22. The notifying apparatus according to claim 20, wherein the determining unit determines the priority level so that the motion blur notification is made, but the bokeh notification is not, when a percentage of a shooting screen occupied by pixels at which the motion blur amount is greater than or equal to a threshold.

23. The notifying apparatus according to claim 20, wherein the determining unit determines the priority level so that the motion blur notification is made, but the bokeh notification is not, when an aperture value of the shooting optical system has not changed.

24. A notifying apparatus comprising at least one processor and/or at least one circuit which functions as:
   an obtaining unit configured to obtain a first image shooting condition and motion information in first image shooting performed with the first image shooting condition;
   a setting unit configured to set a second image shooting condition independently from the first image shooting condition;
   an estimating unit configured to estimate a motion blur amount in second image shooting performed with the second image shooting condition, on the basis of the first image shooting condition, the motion information, and the second image shooting condition; and
   a notifying unit configured to control a motion blur notification on the basis of the motion blur amount based on a user operation for changing a shooting condition.

25. The notifying apparatus according to claim 24, wherein
   the determining unit is further configured to determine whether to make a second notification different from the motion blur notification, on the basis of a predetermined notification condition; and
   the notifying unit is further configured to control a second notification different from the motion blur notification on the basis of a predetermined notification condition.

26. An image capturing apparatus comprising:
   the notifying apparatus according to claim 1; and
   an image sensor.

27. An image capturing apparatus comprising:
   the notifying apparatus according to claim 4; and
   an image sensor.

28. A notifying method executed by a notifying apparatus, comprising:
   acquiring a first image shooting condition and motion information in first image shooting performed with the first image shooting condition;
   setting a second image shooting condition;
   estimating motion blur in second image shooting performed with a second image shooting condition, based on the first image shooting condition, the motion information, and the second image shooting condition; and
   controlling a motion blur notification on the basis of the estimated motion blur according to a user operation for changing a shooting condition.

29. A notifying method executed by a notifying apparatus, comprising:
   obtaining a motion blur amount of an object and a bokeh amount produced by a shooting optical system from an image obtained through first image shooting, the first image shooting being carried out repeatedly at predetermined intervals of time; and
   controlling one or both of a motion blur notification and a bokeh notification based on a user operation for changing a shooting condition and a priority level for the motion blur notification based on the motion blur amount.

30. A non-transitory computer-readable storage medium which stores a program for causing a computer to execute a notifying method comprising:
   acquiring a first image shooting condition and motion information in first image shooting performed with the first image shooting condition;
   setting a second image shooting condition;
   estimating motion blur in second image shooting performed with a second image shooting condition, based on the first image shooting condition, the motion information, and the second image shooting condition; and
   controlling a motion blur notification on the basis of the estimated motion blur according to a user operation for changing a shooting condition.

* * * * *